(12) United States Patent
Liu et al.

(10) Patent No.: US 10,797,770 B2
(45) Date of Patent: Oct. 6, 2020

(54) NON-UNIFORM ANTENNA ARRAY AND SIGNAL PROCESSING THEREFOR

(71) Applicant: Sony Corporation, Tokyo (JP)

(72) Inventors: Wendong Liu, Beijing (CN); Zhaocheng Wang, Beijing (CN); Jinhui Chen, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/072,777

(22) PCT Filed: Dec. 28, 2016

(86) PCT No.: PCT/CN2016/112512
§ 371 (c)(1),
(2) Date: Jul. 25, 2018

(87) PCT Pub. No.: WO2017/128915
PCT Pub. Date: Aug. 3, 2017

(65) Prior Publication Data
US 2019/0068259 A1    Feb. 28, 2019

(30) Foreign Application Priority Data

Jan. 26, 2016  (CN) .......................... 2016 1 0051745

(51) Int. Cl.
*H04B 7/06* (2006.01)
*H04B 7/0456* (2017.01)
(Continued)

(52) U.S. Cl.
CPC ............. *H04B 7/061* (2013.01); *H01Q 1/246* (2013.01); *H01Q 21/06* (2013.01); *H01Q 21/22* (2013.01); *H04B 7/0456* (2013.01); *H04B 7/0469* (2013.01); *H04B 7/0473* (2013.01); *H04B 7/0639* (2013.01); *G01S 13/876* (2013.01); *G01S 2013/9316* (2020.01)

(58) Field of Classification Search
CPC .... H04B 7/061; H04B 7/0456; H04B 7/0469; H04B 7/0473; H04B 7/0639; H01Q 21/22
USPC ........................................... 375/267
See application file for complete search history.

(56) References Cited

U.S. PATENT DOCUMENTS

2009/0041150 A1   2/2009  Tsai et al.
2009/0279630 A1*  11/2009  Ma .................... H04B 7/0417
                                                      375/267
(Continued)

FOREIGN PATENT DOCUMENTS

CN    202372459 U  *  8/2012
CN    202372459 U     8/2012
(Continued)

OTHER PUBLICATIONS

English language International Search Report dated Mar. 28, 2017 in corresponding International Application PCT/CN2016/112512.

*Primary Examiner* — Kevin M Burd
(74) *Attorney, Agent, or Firm* — Xsensus LLP

(57) ABSTRACT

The present disclosure relates to a non-uniform antenna array and signal processing therefor. Specifically disclosed is a device at a transmitting end, comprising a plurality of antenna elements arranged in a vertical direction. Spaces between adjacent antenna elements of at least a part of the plurality of antenna elements increase gradually in a first direction.

9 Claims, 14 Drawing Sheets

(51) Int. Cl.
*H01Q 21/06* (2006.01)
*H01Q 1/24* (2006.01)
*H01Q 21/22* (2006.01)
G01S 13/87 (2006.01)
G01S 13/931 (2020.01)

(56) References Cited

U.S. PATENT DOCUMENTS

| | | | | |
|---|---|---|---|---|
| 2010/0232525 A1* | 9/2010 | Xia | ............... | H04B 7/0626 |
| | | | | 375/259 |
| 2011/0012804 A1 | 1/2011 | Thales | | |
| 2011/0194638 A1* | 8/2011 | Erell | ............... | H04B 7/0417 |
| | | | | 375/267 |
| 2013/0130706 A1* | 5/2013 | Halbauer | ............ | H04W 72/046 |
| | | | | 455/450 |

FOREIGN PATENT DOCUMENTS

| | | |
|---|---|---|
| CN | 103491621 A | 1/2014 |
| CN | 103715518 A | 4/2014 |
| WO | 2015/100670 A1 | 7/2015 |

* cited by examiner

NON-UNIFORM ANTENNA ARRAY AND SIGNAL PROCESSING THEREFOR

This application is a national stage (under 35 U.S.C. 371) of International Patent Application No. PCT/CN2016/112512, filed Dec. 28, 2016, claiming priority to Chinese Patent Application No. 201610051745.X, filed Jan. 26, 2016, both of which are herein incorporated by reference in their entirety.

TECHNICAL FIELD

The present disclosure generally relates to an antenna and signal processing therefor, and more specifically, to a non-uniform antenna array and signal processing therefor.

BACKGROUND

A massive multiple-input multiple-output (MIMO) technology has drawn extensive attention in academic and industrial fields in recent years, which can improve spectral efficiency and energy efficiency significantly. In the traditional MIMO technology, a uniform linear array of antennas (ULA) is usually configured at a base station end. However, in the massive MIMO technology, since the number of antennas is large, it is difficult to configure a massive uniform linear array of antennas (ULA) at the base station end.

In recent years, a 3D MIMO technology has been proposed, which solves the problem of space limitation of the traditional massive MIMO by configuring a two dimensional uniform antenna array (URA) at the base station. FIG. 1A exemplarily illustrates an antenna array of the prior 3D MIMO. In FIG. 1A, each square represents an antenna element. As shown in FIG. 1A, in the antenna array of the prior 3D MIMO, the uniform antenna array is still used, i.e. antenna elements are arranged uniformly in both horizontal and vertical directions.

In a paper "Full-dimensional MIMO (FD-MIMO) for next generation cellular technology" by Y. H. Nam, B. L. Ng, K. Sayana, Y. Li, J. Zhang, Y. Kim and J. Lee, IEEE Commun. Mag., vol. 51, no. 6, pp. 172-179, June 2013, the research shows that a massive 3D MIMO system may improve spectral efficiency and energy efficiency significantly by using a simple linear precoding and detection algorithm. In a paper "CSI-RS design for 3D MIMO in future LTE-advanced" by Y. Song, S. Nagata, H. Jiang and L. Chen, Proc. ICC 2014, pp. 5101-5106, June 2014, it is proposed that the use of a Kronecker product structure of a three dimensional channel matrix may effectively reduce the complexity of a traditional signal processing algorithm when the number of antennas increases. Based on the Kronecker product structure, there have already been a two dimensional beam-forming scheme and a two dimensional precoding scheme for 3D MIMO.

The 3D MIMO antenna system provides degrees of freedom in the horizontal direction and in the vertical direction. An extra degree of freedom in a vertical domain may be used to reduce interference between users, and improve the system performance. The two dimensional beam-forming and two dimensional precoding schemes first perform beam-forming and precoding in the vertical direction, and then perform precoding on the horizontal equivalent channel. The Kronecker product is made by using a beam-forming vector or a precoding vector in the vertical direction and a precoding vector in the horizontal direction, to obtain precoding matrices for different users. This reduces interference between users effectively, and the complexity of the algorithm is relatively low, thereby obtaining better performance.

SUMMARY

However, the inventor of the present disclosure has found that the traditional 3D MIMO antenna system has defects. Generally, users' horizontal angles of arrival are distributed uniformly in a relatively large range, and antennas in the horizontal direction can be distinguished by different users' horizontal angles of arrival. However, when users are located at a same height approaching the ground, different users' vertical angles of arrival are distributed non-uniformly only in a relatively small range, interference between users is relatively large, discrimination of different users by the antenna array distributed uniformly in the vertical direction is bad, which results in a low resolution of URA in the vertical direction. Therefore, the actual research shows that, if a same number of antennas are adopted, in a case where the space condition allows, it is possible to obtain best performance to arrange antennas in a linear antenna array. On the contrary, when antennas are arranged in the 3D MIMO antenna array, performance gain caused by increase in the number of antennas in the vertical direction is relatively low and can not compensate performance loss caused by decrease in the number of antennas in the horizontal direction.

In addition, the uniform antenna array distribution in the vertical direction and the signal processing method of the traditional 3D MIMO antenna system are not applicable to a general cell environment. Under certain space constraints, it is necessary to propose a more suitable antenna array arrangement mode design and a signal processing method more suitable for 3D MIMO.

Therefore, in order to solve at least one of the above mentioned problems, the present disclosure provides the following aspects.

According to one aspect of the present disclosure, there is provided a device at a transmitting end, characterized in that the device comprises: a plurality of antenna elements arranged in a vertical direction, wherein spaces between adjacent antenna elements of at least a part of the plurality of antenna elements increase gradually in a first direction.

According to one aspect of the present disclosure, there is provided a device at a receiving end, characterized in that the device comprises: a processing circuitry configured to: acquire a reference signal from a device at a transmitting end; perform channel estimation based on the reference signal; and determine channel state information for feeding back to the device at the transmitting end, based on a result of the channel estimation and information on non-uniform distribution of a plurality of antenna elements associated with the device at the transmitting end, wherein spaces, in a vertical direction, between adjacent antenna elements of at least a part of the plurality of antenna elements associated with the device at the transmitting end increase gradually in a direction approaching the device at the receiving end or ground, or in a direction getting away from the device at the receiving end or ground.

According to one aspect of the present disclosure, there is provided a device at a transmitting end, characterized in that the device comprises: a processing circuitry configured to: generate non-uniform distribution information indicating non-uniform distribution state of a plurality of antenna elements associated with the device; acquire channel state information from a device at a receiving end; and determine a channel state based on the channel state information and the non-uniform distribution information, wherein spaces, in a vertical direction, between adjacent antenna elements of at least a part of the plurality of antenna elements associated with the device at the transmitting end increase gradually in a direction approaching the device at the receiving end or ground, or in a direction getting away from the device at the receiving end or ground.

According to one aspect of the present disclosure, there is provided a method for wireless communication, characterized in that the method comprises: arranging a plurality of antenna elements in a vertical direction, wherein spaces between adjacent antenna elements of at least a part of the plurality of antenna elements increase gradually in a first direction.

According to one aspect of the present disclosure, there is provided a method for wireless communication, characterized in that the method comprises: acquire a reference signal from a device at a transmitting end; perform channel estimation based on the reference signal; and determine channel state information for feeding back to the device at the transmitting end, based on a result of the channel estimation and information on non-uniform distribution of a plurality of antenna elements associated with the device at the transmitting end, wherein spaces, in a vertical direction, between adjacent antenna elements of at least a part of the plurality of antenna elements associated with the device at the transmitting end increase gradually in a direction approaching the device at the receiving end or ground, or in a direction getting away from the device at the receiving end or ground.

According to one aspect of the present disclosure, there is provided a method for wireless communication, characterized in that the method comprises: generate non-uniform distribution information indicating non-uniform distribution state of a plurality of antenna elements associated with the device; acquire channel state information from a device at a receiving end; and determine a channel state based on the channel state information and the non-uniform distribution information, wherein spaces, in a vertical direction, between adjacent antenna elements of at least a part of the plurality of antenna elements associated with the device at the transmitting end increase gradually in a direction approaching the device at the receiving end or ground, or in a direction getting away from the device at the receiving end or ground.

By designing distribution of an antenna array in a vertical direction of a 3D MIMO antenna system to be non-uniform and designing a new signal processing method according to the new distribution mode, the present disclosure utilizes the degree of freedom in the vertical direction of the 3D MIMO antenna system better, such that the present disclosure achieves better antenna performance.

DRAWINGS

DETAILED DESCRIPTION

Figure 1:
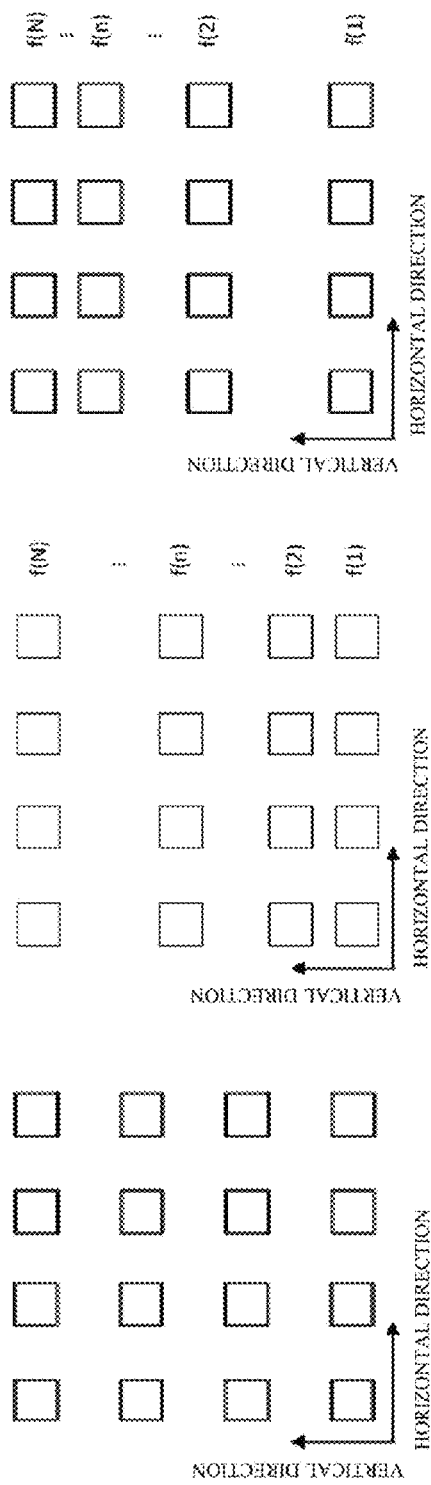
FIG. 1A is a schematic view illustrating uniform distribution of a 3D MIMO antenna array in the prior art.
FIG. 1B is a schematic view illustrating non-uniform distribution of an antenna array according to one embodiment.
FIG. 1C is a schematic view illustrating non-uniform distribution of an antenna array according to another embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. System overview
2. Antenna array of device at transmitting end
3. Process of device at receiving end
4. Process of device at transmitting end
5. Simulation result
6. Application examples
7. Conclusion <1. System Overview>

Figure 2:
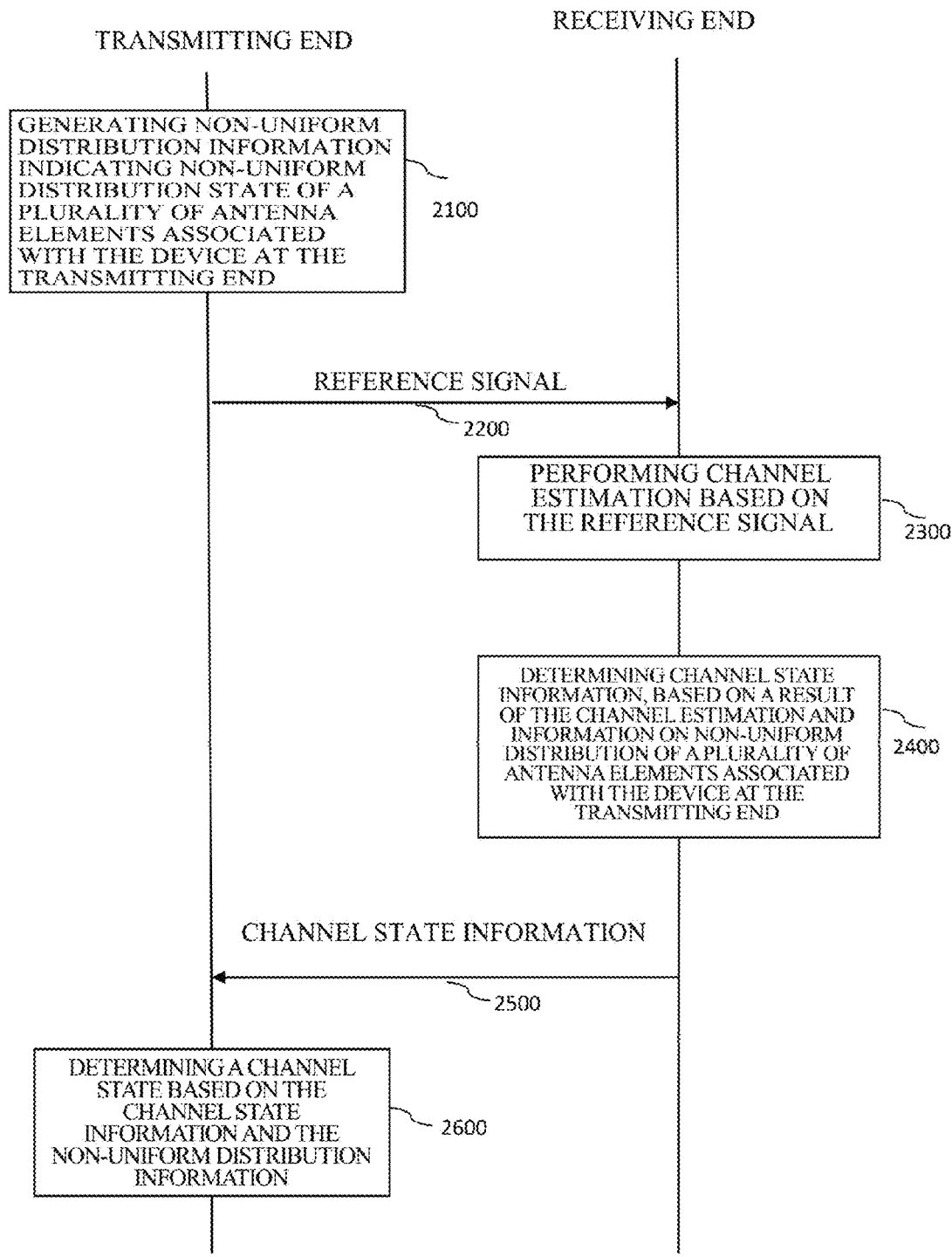
FIG. 2 is a flow chart illustrating communication between a device at a transmitting end and a device at a receiving end according to one embodiment.

FIG. 2 is a flow chart illustrating a general communication process between a device at a transmitting end (such as, a base station, a Node B, an e-Node B) and a device at a receiving end (such as, a user apparatus and a terminal apparatus) according to an embodiment.

At 2100, the device at the transmitting end generates non-uniform distribution information indicating non-uniform distribution state of a plurality of antenna elements associated with the device at the transmitting end.

At 2200, the device at the transmitting end transmits a reference signal to the device at the receiving end. At 2200, in addition to the reference signal, the transmitting end may also transmit non-uniform distribution information, where the reference signal and the non-uniform distribution information are usually transmitted separately, e.g. carried by different channels. Specifically, in an example of a LTE communication system, information on non-uniform distribution is for example contained in a control signaling regarding radio resources in a upper layer, e.g. AntennaInfo signaling:

```
AntennaInfoCommon ::= SEQUENCE {
    antennaPortsCount   ENUMERATED {an1, an2, an4, spare1},
    AntennaNon-uniformFactor ENUMERATED {α1, α2, α3,...αn,
sparem, sparem-1,...,spare 1 }
}
```

That is, n optional α are defined in advance within the communication protocol, one of them is designated by the device at the transmitting end, and the device at the transmitting end may also reserve some bits for future optional α, i.e. sparem. For example, through traversal search, the device at the transmitting end may select an optimal α from the multiple predefined α. Since candidate values of α are limited, such operation may reduce the complexity of selecting α and expedite the search speed. In addition, when values of α are configured to be static values or quasistatic values, the above mentioned n optional α may respectively correspond to preferable α values under various sizes of antenna arrays. The side of the device at the transmitting end (e.g. the side of the operator) may select a corresponding a according to the current antenna array size, and then it is notified to the device at the receiving end by the device at the transmitting end at an appropriate time.

In another example, α is not selected from a predetermined static set, but decided dynamically by the device at the transmitting end. In this case, α may be indicated in the following way:

AntennaNon-uniformFactor BIT STRING (SIZE (n))

Of course, it is also possible to add information of the total number of antenna elements to an antenna information signaling. If the number N of the non-uniform antennas is not equal to the number of all antenna elements, it is also possible to add information of N additionally, which may be indicated by BIT STRING.

In a case where the device at the transmitting end decides α dynamically, it is possible to determine α by using a method of performing layered quantization on value ranges of α. Taking two-layer-quantization as an example, a large step size may be first used to quantize the value range of α in order to determine a rough range of α fast, which is called a first layer quantization. After the rough range of α is determined, a small step size is then used to finely quantize the rough range so that the quantization value of α is finally determined, which is called a second layer quantization. The use of such a quantization method can reduce the computation complexity of the quantization step. Moreover, when α need to be re-determined due to slow change of the system environment, it is possible to re-perform only the second layer quantization to search the quantization value of α. This is because, at this time, α will not deviate too much from the quantization value determined last time. In this way, time required to re-determine α as well as the computation complexity is greatly reduced. It is also possible to use a quantization method of more layers, the principle of which is similar to that of the two-layer-quantization.

In addition, the antenna array may also use fixed non-uniform distribution (e.g. α is fixed to be 1.8), i.e. there are only two states, i.e., uniform and non-uniform, in the system:

```
AntennaInfoCommon ::= SEQUENCE {
    antennaPortsCount ENUMERATED {an1, an2, an4, spare1},
    AntennaNon-uniformStatus ENUMERATED {0, 1},
}
```

When AntennaNon-uniformStatus has a value of 1, the device at the receiving end determines that the antenna array is non-uniform, so a codeword can be selected from a codebook corresponding to non-uniform distribution for feeding back to the device at the transmitting end.

Specifically, the signaling is carried by a corresponding radio resource control (RRC) message. For example, in a case where a change occurs, a RRCConnectionReconfiguration message of AntennaNon-uniformFactor containing the change may be generated by the device at the transmitting end, to notify respective devices at the receiving end. It is understood that, the present invention is not limited to the LTE system. In other communication systems, it is also possible to design other signaling for carrying the above mentioned non-uniform distribution information, e.g. broadcast signaling, according to teaching of the present invention. In comparison with such dedicated signaling as RRC, the notification efficiency of the broadcast signaling is likely higher. Designing from another angle, for some application scenarios, it may also be carried by MAC layer signaling or physical layer signaling in a lower layer, so that it is adapted to changes in frequent antenna distribution.

At 2300, the device at the receiving end receives a reference signal, and performs channel estimation based on the reference signal.

At 2400, the device at the receiving end determines channel state information based on a result of the channel estimation and information on non-uniform distribution of a plurality of antenna elements associated with the device at the transmitting end.

At 2500, the device at the receiving end feeds back channel state information to the device at the transmitting end.

At 2600, the device at the transmitting end determines a channel state based on channel state information and non-uniform distribution information.

Hereinafter, the present disclosure will be described specifically from angles of the device at the transmitting end and the device at the receiving end, respectively.

<2. Antenna Array of Device at Transmitting End>

Figure 3:
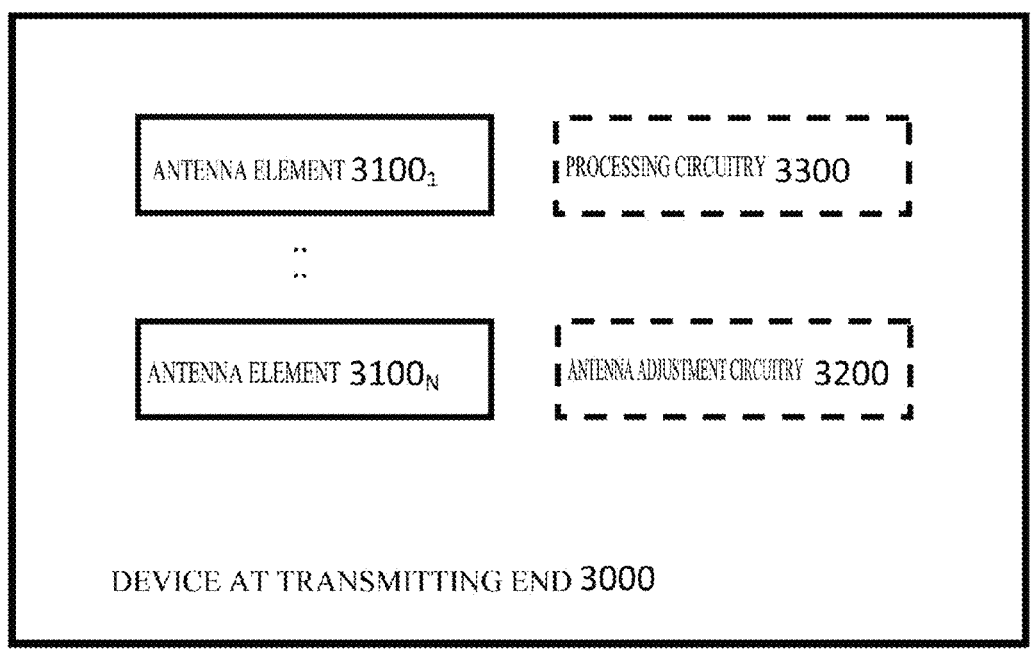
FIG. 3 is a block diagram illustrating an example of a configuration of a device at a transmitting end according to one embodiment.
Figure 11:
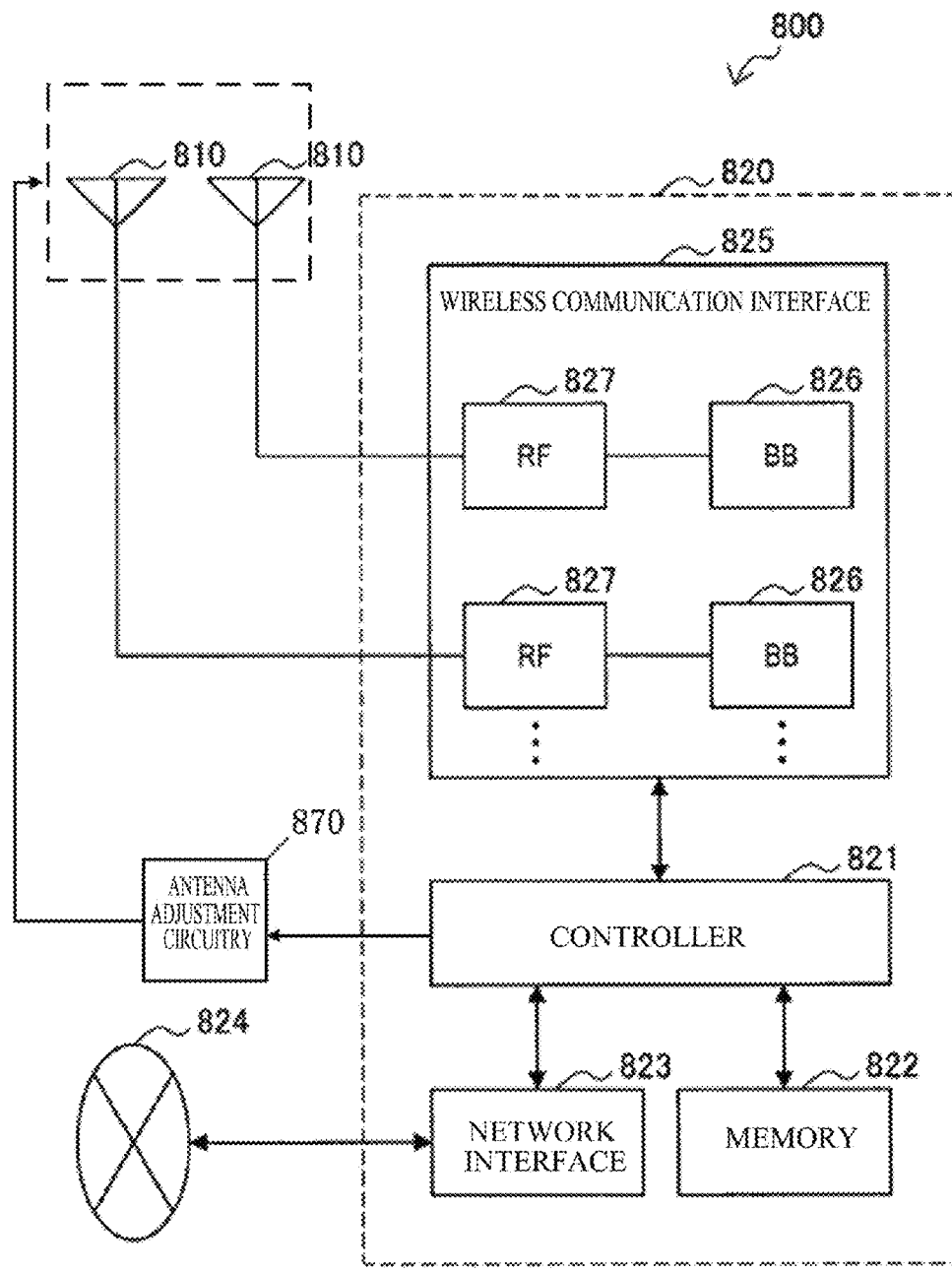
FIG. 11 is a block diagram illustrating a first example of a schematic configuration of an eNB.

FIG. 3 is a block diagram illustrating an example of a configuration of a device 3000 at a transmitting end according to one embodiment. The device 3000 at the transmitting end may be a base station, a Node B, an e-Node B etc., or key components therein, e.g. a processing chip therein rather than a complete product, or e.g. a base station device 820 and an antenna 810 as shown in FIG. 11.

As shown in FIG. 3, the device 3000 at the transmitting end may include a plurality of antenna elements $3100_1$ ... $3100_N$ arranged in a vertical direction. Spaces between adjacent antenna elements of at the least part of the plurality of antenna elements $3100_1$ ... $3100_N$ increase gradually in a first direction.

For example, FIG. 1B is a schematic view illustrating non-uniform distribution of an antenna array according to one embodiment. FIG. 1C is a schematic view illustrating non-uniform distribution of an antenna array according to another embodiment. In FIGS. 1B and 1C, each square represents an antenna element. Unlike the antenna array in FIG. 1A, in FIGS. 1B and 1C, although the size of the space occupied by the antenna arrays as a whole is the same as that of the space occupied by the antenna array in FIG. 1A, the antenna elements in the antenna arrays in FIGS. 1B and 1C are non-uniformly distributed in the vertical direction, spaces between adjacent antenna elements increase gradually. Specifically, in FIG. 1B, spaces between adjacent antenna elements increase gradually in a direction getting away from the device at the receiving end or ground. In FIG. 1C, spaces between adjacent antenna elements increase gradually in a direction approaching the device at the receiving end or ground. For the sake of simplicity, both FIGS. 1B and 1C show that, antenna elements in the horizontal direction are uniformly distributed. However, antenna elements in the horizontal direction may also be non-uniformly distributed.

The term "horizontal direction" as used herein is not limited to the absolute horizontal direction, but refers to a direction parallel to the traditional linear antenna array. Likewise, the term "vertical direction" may refer to a direction of a dimension added in the 3D MIMO antenna array in comparison with the traditional linear antenna array. Therefore, in reality, according to the real situation of installing the antenna array, the "vertical direction" may refer to any one dimension of the 3D antenna array.

Figure 4:
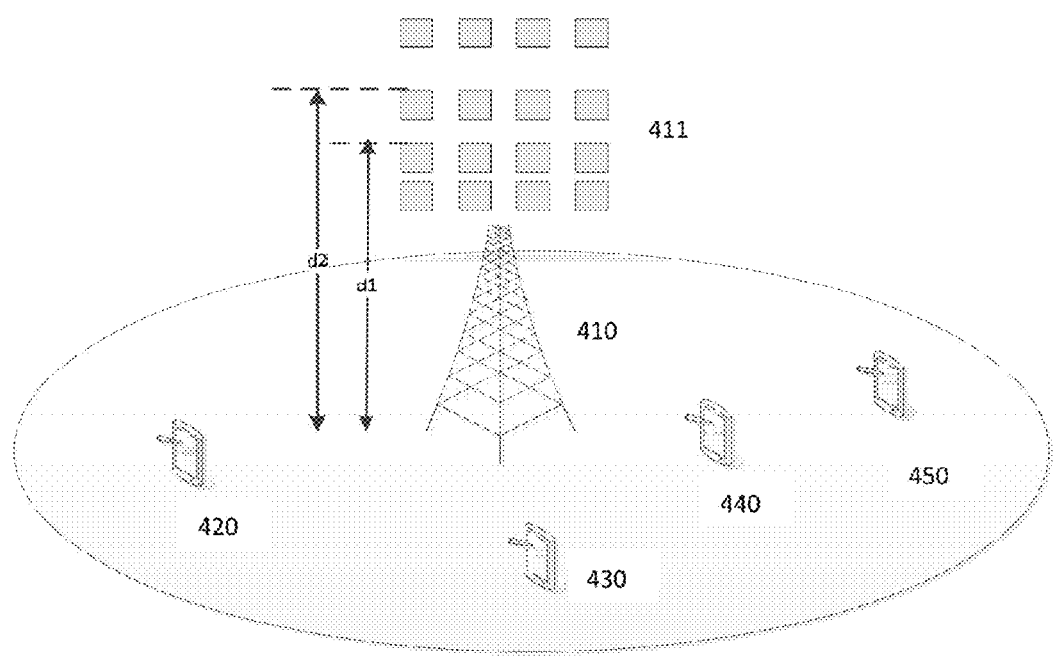
FIG. 4 is a schematic view illustrating a communication system of according to one embodiment.

FIG. 4 is a schematic view illustrating a communication system according to one embodiment. As shown in FIG. 4, a user apparatus 420, 430, 440, 450 are distributed around a base station 410. The base station 410 has a 3D MIMO antenna array 411 as shown in FIG. 1B. FIG. 4 shows that spaces $d_2$-$d_1$ between adjacent antenna elements in the vertical direction in the antenna elements in the antenna array 411 increase as the height of the antenna elements relative to the ground increases. As an instance, spaces between adjacent antenna elements may increase as the distance from the device at the receiving end increases. For example, spaces between adjacent antenna elements may increase as the distance from the device at the receiving end increases, as a vertical distance from the average height of a plurality of devices at the receiving end increases, as the height of the antenna elements or the distance of the antenna elements from the ground increases. Spaces between adjacent antenna elements may decrease as the distance from the ground or the device at the receiving end increases, i.e. in a direction approaching the ground or the device at the receiving end, spaces between adjacent antenna elements increase gradually, as shown in FIG. 1C.

Although FIGS. 1B and 1C respectively show that spaces between antenna elements in the vertical direction in the antenna array increase gradually and decrease gradually, this is only an exemplary case. In some embodiments, not all parts of the antenna array are needed to be in non-uniform distribution. For example, only a part of the antenna elements in the antenna array adopting non-uniform distribution is also feasible. There may also be other more complex cases. For example, the plurality of antenna elements $3100_1 \ldots 3100_N$ may be divided into a plurality of groups $\{3100_1 \ldots 3100_{g1}\}, \{3100_{g1} \ldots 3100_{g2}\} \ldots \{3100_{gk} \ldots 3100_N\}$ ($1 \le g1 \le g2 \le \ldots \le gk \le N$), each group is constituted by adjacent antenna elements, the number of antenna elements in each group may be one or more. Antenna elements within each group are distributed uniformly, but spaces between adjacent antenna groups are in non-uniform distribution. Further, for example, spaces between respective antenna groups are in uniform distribution, but spaces between antenna elements in at least one antenna group adopt non-uniform distribution. Likewise, both spaces between antenna groups and spaces between antenna elements within antenna groups being in non-uniform distribution is also feasible. In addition, a part of antenna elements in the antenna array may adopt a first kind of non-uniform distribution, while another part of antenna elements in the antenna array may adopt a second kind of non-uniform distribution different from the first kind of non-uniform distribution.

Via experimentation and simulation, the inventor of the present disclosure has found that, in comparison with a scheme where the antenna elements are distributed uniformly in the vertical direction, in the vertical direction, under some antenna array sizes or other working parameters, when spaces between adjacent antenna elements increase as the distance from the device at the receiving end or ground increases, the entire antenna array can better distinguish different users' angles of arrival so that it is possible to increase discrimination of different users by the antenna elements in the vertical direction, which improves the performance gain of the 3D MIMO antenna system. Under some other antenna array sizes or other working parameters, the case is contrary: when spaces between adjacent antenna elements decrease as the distance from the device at the receiving end or ground increases, the performance gain of the 3D MIMO antenna system is improved. In this process, the antenna array size is a main factor that affects the distribution mode of the antenna elements. Therefore, it is necessary to select the distribution mode of the antenna elements mainly according to the specific antenna array size.

Referring back to FIG. 3, as shown in FIG. 3, the device 3000 at the transmitting end may also optionally include an antenna adjustment circuitry 3200. The antenna adjustment circuitry may adjust spaces among the plurality of antenna elements $3100_1 \ldots 3100_N$ in the vertical direction. For example, using the antenna adjustment circuitry 3200, it is possible to pre-adjust spaces among the plurality of antenna elements $3100_1 \ldots 3100_N$ when installing them. Further, for example, the antenna adjustment circuitry 3200 may also adjust spaces among the plurality of antenna elements $3100_1 \ldots 3100_N$ dynamically or quasistatically during their use, so that spaces among the plurality of antenna elements $3100_1 \ldots 3100_N$ can be adapted to dynamic changes in the channel or changes in the antenna array size, further improving their discrimination of different users in the vertical direction. The antenna adjustment circuitry 3200 may be connected to a pedestal for installing the antenna elements at one end, and at the other end, operatively coupled to a back end control circuit to automatically adjust spaces between antenna elements, or connected to a user interface to be used by an operator to manually adjust spaces between antenna elements.

As aforementioned, spaces between adjacent antenna elements of at least a part of the plurality of antenna elements $3100_1 \ldots 3100_N$ may increase gradually in a certain direction, e.g. increase gradually in a direction approaching the ground or the device at the receiving end, or increase gradually in a direction getting away from the ground or the device at the receiving end. Preferably, the spaces may be determined according to a non-linear function $f(n)$. $f(n)$ denotes a position of a nth antenna element relative to a 1st antenna element. After reading the following specification, those skilled in the art will recognize that the non-linear function f(n) may adopt various appropriate forms. For example, the non-linear function f(n) may be at least one of a power function, an exponential function, a tangent function.

Hereinafter, a preferable embodiment in which f(n) is a power function is explained in conjunction with an instance. However, those skilled in the art may recognize that the real situation is not limited to this. For example, the non-linear function f(n) may also be expressed as at least one of an exponential function $$f(n) = D\left(N^{\left(\frac{n-1}{N-1}\right)^\mu} - 1\right)$$

and a tangent function $$f(n) = D(N-1)\tan\frac{\pi}{4}\left(\frac{n-1}{N-1}\right)^\upsilon,$$

where μ, υ are parameters in the exponential function and the tangent function respectively, numerical values thereof may be adjusted and notified to the device at the receiving end. Experiments show that in a case where f(n) is a power function, an exponential function, or a tangent function, for the same 3D MIMO antenna array size, average spectral efficiency curves of the antenna array which can be obtained are very close.

In the following description, it is assumed that all of the plurality of antenna elements $3100_1$ ... $3100_N$ follow the same kind of non-uniform distribution function f(n). However, those skilled in the art may recognize that the real situation is not limited to this.

It is assumed that, among the plurality of antenna elements $3100_1$ ... $3100_N$, the position of a first antenna element 31001 is f(1)=0, the position of a Nth antenna element 3100N is f(N)=D(N-1), where D is a constant. Preferably, D is spaces between of antenna elements in the vertical direction under the traditional uniform distribution (URA). In this case, the overall space occupied by the antenna array of non-uniform distribution according to the present disclosure will be equal to the overall space occupied by the antenna array of the traditional uniform distribution.

In the present embodiment, the non-linear function f(n) may be expressed as a form of a power function shown in an equation (1):

$$f(n)=D(n-1)^\alpha/(N-1)^{\alpha-1}, \quad (1)$$

where n is a sequence number of an antenna element, f(n) is a distance between a nth antenna element and a 1st antenna element, and α is an adjustable exponential factor and larger than 0.

An advantage of using the non-linear function f(n) to determine spaces among the plurality of antenna elements $3100_1$ ... $3100_N$ is that the spaces can be determined in a more simple way. For example, in a case where a power function is used to determine spaces among the plurality of antenna elements $3100_1$ ... $3100_N$, it is possible to adjust the spaces by adjusting the exponential factor α simply. In the equation (1), when α>1, spaces among the antenna elements $3100_1$ ... $3100_N$ increase gradually in the direction getting away from the ground or the device at the receiving end, as shown in FIG. 1B, and the larger the α is, the more non-uniformly the antenna elements $3100_1$ ... $3100_N$ are distributed. For example, when α=2, the power function is a quadratic function, the distribution of the antenna elements $3100_1$ ... $3100_N$ is quadratic distribution. When α=1, the function f(n) is degraded into a linear function, at this time, the distribution of the antenna elements $3100_1$ ... $3100_N$ is also changed into uniform distribution. When α<1, spaces among the antenna elements $3100_1$ ... $3100_N$ increase gradually in the direction approaching the ground or the device at the receiving end, as shown in FIG. 1C. Whatever values α has, the antenna array occupies the same space, but has different antenna element distribution situations.

Spaces among the plurality of antenna elements $3100_1$ ... $3100_N$ are related to user distribution, building height and building distribution as well as distribution of users' angles of arrival.

In one embodiment, the distribution mode of the antenna array, namely spaces between antenna elements, may be determined based on the number of antenna elements. At a later time, cases where the exponential factor α selects values under different numbers of antenna elements will be described with reference to Table 1. Specifically, given a specific number of antenna elements, with respect to a specific optimization objective, e.g. average spectral efficiency, throughput, signal to noise ratio, best spectral efficiency and worst spectral efficiency, optimization may be performed to select an antenna array distribution mode which conforms to the optimization objective best. In this case, the obtained antenna array distribution mode is relatively fixed, is relatively stable in a long time, does not change dynamically in real time with changes in the transmission environment, and is static or quasistatic.

In another embodiment, spaces among the plurality of antenna elements $3100_1$ ... $3100_N$ may also be dynamically changed based on a working parameter. For example, the device 3000 at the transmitting end may adjust spaces among the plurality of antenna elements $3100_1$ ... $3100_N$ according to at least one of a number of the antenna elements, coverage of the device, a number of users served by the device, channel state and a parameter related to user distribution.

For example, spaces among the plurality of antenna elements $3100_1$ ... $3100_N$ may be determined based on an angle of arrival, which is an angle between a signal received from a device at a receiving end and a normal of an antenna plane. Specifically, the device 3000 at the transmitting end may acquire angle of arrival information and channel quality information from signals fed back from respective devices at the receiving end, then calculate the optimization objective (e.g. user average frequency efficiency) in different antenna array distribution modes according to these information, and select an antenna array distribution mode which optimizes the optimization objective, i.e. spaces between antenna elements. In the present invention, with respect to a specific distribution case of angles of arrival, codebooks of channel precoding corresponding to different antenna array distribution modes are different, such that precoding efficiency is different, and therefore, indexes such as user average spectral efficiency, throughput, signal to noise ratio are also different. Therefore, it is possible to select the most appropriate antenna array distribution mode via computation and simulation. In a subsequent part of the specification, a method of determining antenna spaces according to angles of arrival will also be described specifically.

Figure 9A:
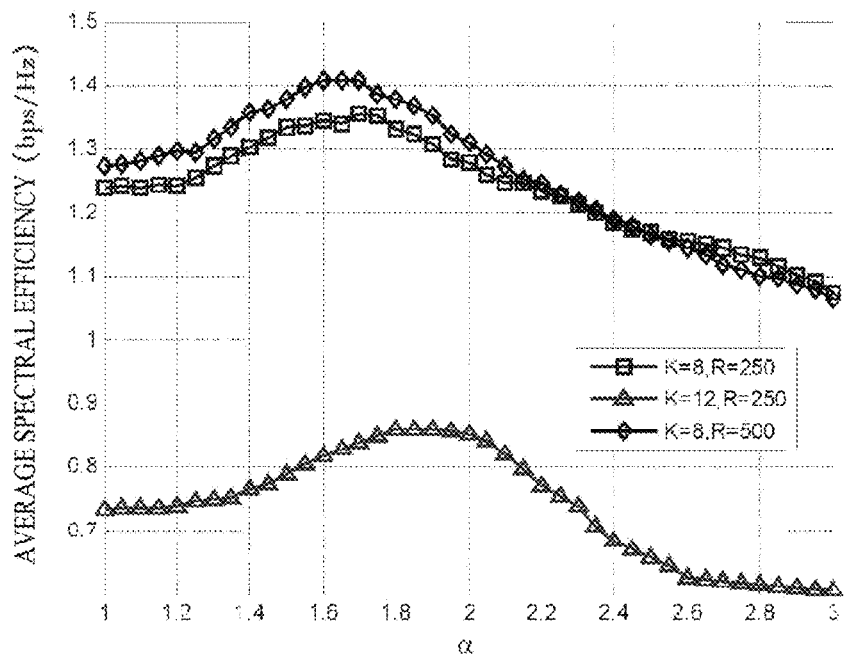
FIG. 9A is a simulation diagram illustrating a user's average spectral efficiency when different exponential factors are used in a case where the size of an antenna array is 8×8.

As already described before, in a case where the non-linear function f(n) representing antenna spaces is expressed as the power function shown in the equation (1), when the exponential factor α=1, the function f(n) is degraded into a linear function, at this time, the distribution of the antenna elements $3100_1 \ldots 3100_N$ is also changed into uniform distribution. When α>1, the larger the α is, the more non-uniformly the antenna elements $3100_1 \ldots 3100_N$ are distributed. However, as α increases, spaces between a part of the antenna elements $3100_1 \ldots 3100_N$ will become too small, such that interference between this part of the antenna elements exceeds a tolerable limit, which causes reduction in performance of the entire antenna array. Therefore, preferably, the value of a should keep the performance gain of the antenna array to be positive. When α<1, there is similar consideration. FIG. 9A is a simulation diagram illustrating a user's average spectral efficiency when different exponential factors α are used in a case where the size of the antenna array is 8×8. K is a total number of users, R is a radius of a cell. It may be seen that, increase in the radius R of the cell causes reduction in performance (reduction in average spectral efficiency), this is because there will be more users distributed at locations which are further away from the base station; increase in the number of users also causes reduction in performance (reduction in average spectral efficiency), this is because interference between users increases.

However, it may be found that, as shown in FIG. 9A, with respect to different Ks and different Rs, when the exponential factor α is larger than 2.4, all of users' average spectral efficiencies are less than the user' average spectral efficiency when the exponential factor α=1. That is, when α>2.4, performance of the antenna array is even worse than that of the antenna array in uniform distribution. Therefore, in a case where the antenna array size is 8×8, preferably, the exponential factor α is less than 2.4.

In addition, it is also noted that, when the value of the exponential factor is 1.7 or so, with respect to different Ks and different Rs, all the average spectral efficiencies approach the highest value. At this time, even a static antenna array may attain relatively stable and good performance. Therefore, preferably, in a case where the antenna array size is 8×8, the exponential factor α is a numerical value between 1.6~1.9.

Figure 9B:
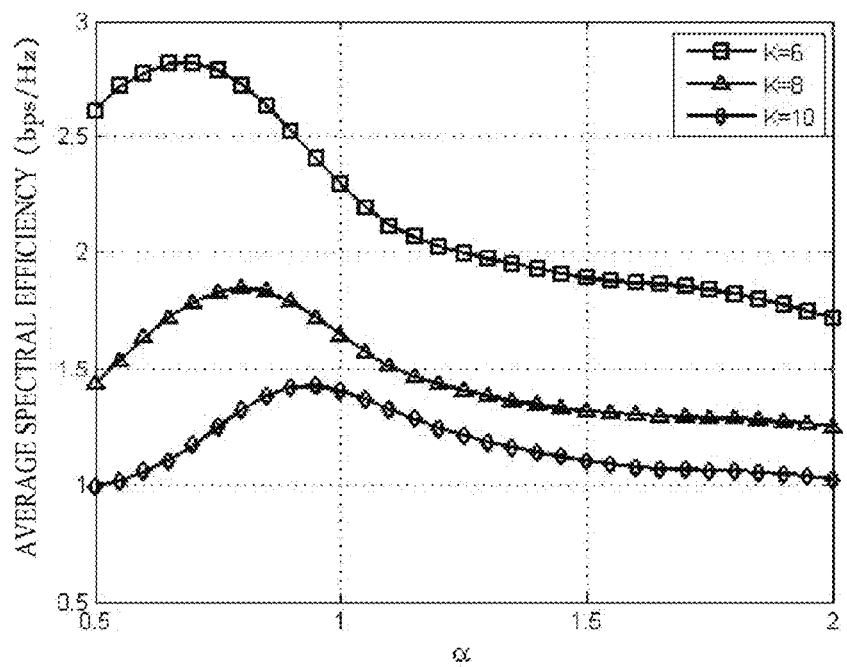
FIG. 9B is a simulation diagram illustrating a user's average spectral efficiency when different exponential factors are used in a case where the size of an antenna array is 32×32.

FIG. 9B is a simulation diagram illustrating a user's average spectral efficiency when different exponential factors α are used in a case where the size of the antenna array is 32×32 and the radius of the cell is 250 m. K is a total number of users. It may be seen that, increase in the number of users also causes reduction in performance. However, it may be found that, unlike the case shown in FIG. 9A, with respect to different Ks, the optimal value of the exponential factor α appears at 0.85 or so.

Experiments show that, selection of the exponential factor α mainly depends on the antenna array size, other parameters which affect the value of the exponential factor α include a number of users served by the device, a radius of a cell, a user distribution case, etc. However, in a case where the antenna array size is fixed, change in the optimal value of α caused by change in other factors is not large.

Table 1 shows values of the exponential factor α under different antenna array sizes.

TABLE 1

| distribution of $α_{opt}$ | | | |
|---|---|---|---|
| antenna array size | $P(α_{opt} > 2)$ | $σ^2_{αopt}$ | $α_{s-opt}$ |
| 8 × 8 | 22% | 0.32 | 1.7 |
| 32 × 32 | 5% | 0.15 | 0.85 |
| 64 × 64 | 2% | 0.11 | 0.7 |

In Table 1, the first column is the antenna array size, the P ($α_{opt}$>2) in the second column represents a probabilit that the optimal value of the exponential factor α is more than 2, the $σ^2_{αopt}$ in the third column represents a variance of values of the exponential factor α when other parameters change, the $α_{s-opt}$ in the fourth column represents recommended quasi-optimal values of the exponential factor α under various antenna array sizes obtained according to statistical averaging of other parameter changes (because the real optimal value is dynamically changed). Thus, it may be seen that, under different antenna array sizes, the exponential factor α has different optimal values.

Preferably, the device 3000 at the transmitting end may also include a processing circuitry, the processing circuitry generates, based on spaces among the plurality of antenna elements $3100_1 \ldots 3100_N$, a precoding matrix for precoding of data to be transmitted. The process of generating the precoding matrix will be described later. The device at the transmitting end which has the antenna array non-uniformly distributed in the vertical direction has already been described above. Likewise, in certain cases, the antenna array in the horizontal direction may also have a similar non-uniform distribution mode. However, for simplicity of the description, according to one embodiment of the present disclosure, a plurality of antenna elements in the horizontal direction of the antenna array of the device 3000 at the transmitting end adopt a uniform distribution mode (as shown in FIGS. 1B, 1C).

Figure 5A:
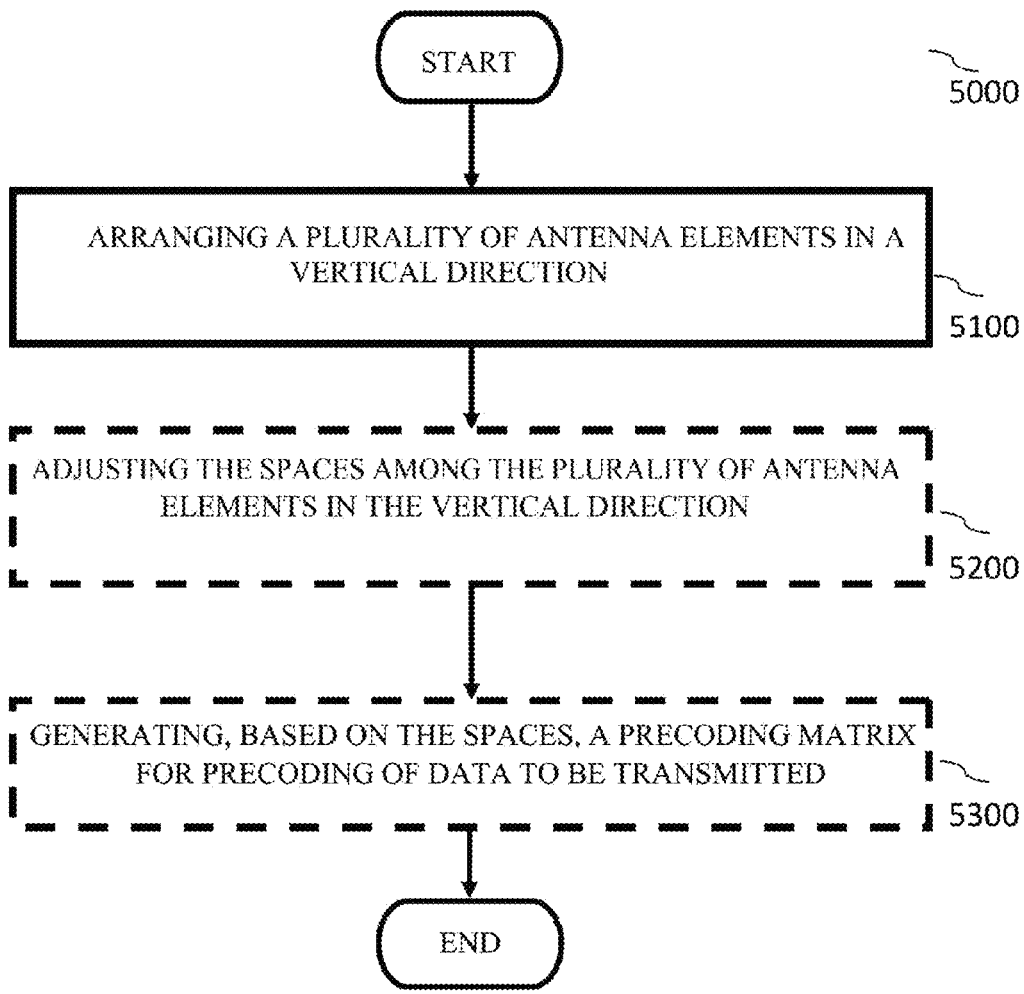
FIG. 5A is a flow chart illustrating a process of a device at a transmitting end according to one embodiment.

FIG. 5A is a flow chart illustrating a process of a device 3000 at a transmitting end according to one embodiment. The process is mainly used to deploy the antenna array at the side of the device at the transmitting end.

As shown in FIG. 5A, a flow 5000 begins with step 5100. In step 5100, a plurality of antenna elements $3100_1 \ldots 3100_N$ are arranged in a vertical direction at the device at the transmitting end. Spaces between adjacent antenna elements of at least a part of the plurality of antenna elements $3100_1 \ldots 3100_N$ may increase gradually in a direction approaching the device at the receiving end or ground, or increase gradually in a direction getting away from the device at the receiving end or ground. Since how to select spaces between antenna elements has already been described in the foregoing part, how to arrange the antenna elements $3100_1 \ldots 3100_N$ is therefore no longer repeated herein.

As shown in FIG. 5A, the flow 5000 may also include optional step 5200 or 5300. The order of steps 5200 and 5300 may be changed, or they may be performed in parallel, may also be performed alternately, which will not influence the achievement of the present disclosure.

In step 5200, spaces among the plurality of antenna elements in the vertical direction are adjusted. Wherein, spaces between adjacent antenna elements of at least a part of the plurality of antenna elements increase gradually in a direction approaching the device at the receiving end or ground, or increase gradually in a direction getting away from the device at the receiving end or ground.

Spaces between antenna elements may be adjusted manually or automatically by the antenna adjustment circuitry as described before. In one embodiment, spaces between antenna elements may be adjusted upon deployment of the antenna array, and when the antenna array is in operation, the spaces will be no longer changed. In another embodiment, when the antenna array is in operation, spaces between antenna elements may be dynamically changed, as necessary.

In step 5300, a precoding matrix is generated based on spaces between antenna elements for precoding of data to be transmitted. Step 5300 may be performed by the processing circuitry as described before. The process of generating the precoding matrix will be described specifically later.

Figure 5B:
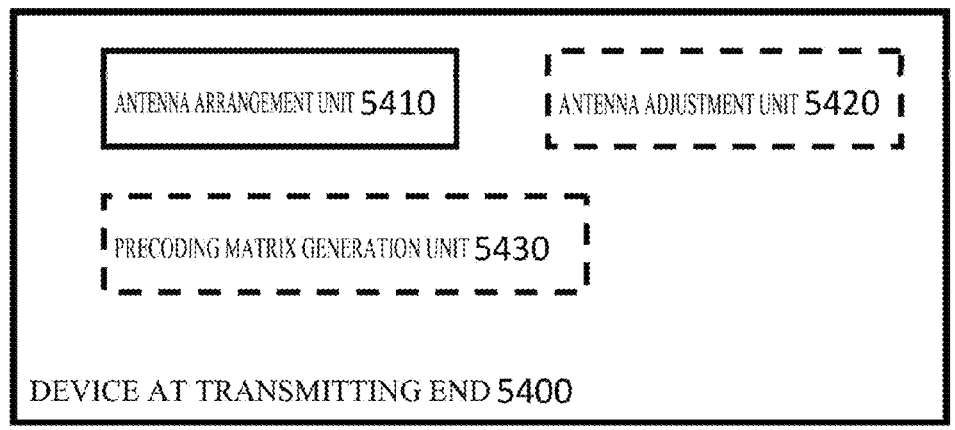
FIG. 5B is a block diagram illustrating a configuration of a device at a transmitting end according to one embodiment.

FIG. 5B is a block diagram illustrating a configuration of a device 5400 at a transmitting end according to one embodiment.

As shown in FIG. 5B, the device 5400 at the transmitting end may include an antenna arrangement unit 5410 to perform step 5100. Optionally, the device 5400 at the transmitting end may also include an antenna adjustment unit 5420 to perform step 5200 as well as a precoding matrix generation unit 5430 to perform step 5300.

Hereinabove, a device at a transmitting end containing an antenna array which has a non-uniform distribution mode has already been described in conjunction with FIGS. 3-5B as well as FIGS. 9A-9B. When the device at the transmitting end adopts an antenna array of non-uniform distribution, codebook design, precoding process etc with respect to an antenna array of uniform distribution in the prior art will be no longer applicable. Likewise, respective process flows of the device at the receiving end and the device at the transmitting end as well as communication process methods between them also change accordingly, so that the antenna array of non-uniform distribution can work normally. Hereinafter, processes of a device at a receiving end and a device at a transmitting end according to an embodiment of the present disclosure will be described respectively.

<3. Process of Device at Receiving End>

According to one embodiment of the present disclosure, a device at a receiving end includes one or more processing circuitry. The one or more processing circuitry may be configured to: acquire a reference signal from a device at a transmitting end; perform channel estimation based on the reference signal; and determine channel state information (CSI) for feeding back to the device at the transmitting end, based on a result of the channel estimation and information on non-uniform distribution of a plurality of antenna elements associated with the device at the transmitting end. Spaces in a vertical direction, between adjacent antenna elements of at least a part of the plurality of antenna elements associated with the device at the transmitting end increase gradually in a direction approaching the device at the receiving end or ground, or in a direction getting away from the device at the receiving end or ground.

For example, in a frequency division duplex (FDD) communication system, the processing circuitry of the device at the receiving end acquires respective channel state information reference symbols (CSI-RS) in the horizontal direction and in the vertical direction from the device at the transmitting end. Then, according to the CSI-RSs in the horizontal direction and in the vertical direction, the device at the receiving end calculates an estimated direction vector of a downlink channel and a channel quality indicator (CQI) representing a modulus of a channel, respectively. In a MIMO system, the channel estimation according to the CSI-RS may adopt a way known in the prior art.

Then, based on the estimated direction vector of the downlink channel as well as the antenna array distribution case at the side of the device at the transmitting end obtained in advance, the processing circuitry of the device at the receiving end may determine a codeword in a codebook of precoding to be used, and feed back it, together with the CQI, to the device at the transmitting end as channel state information. Hereinafter, specific explanation is made in an exemplary way.

It is assumed that the distribution of the antenna elements has the form shown in FIG. 1B, i.e. the antenna elements are distributed uniformly in the horizontal direction, are distributed non-uniformly in the vertical direction, and antenna elements in each column adopt the same non-uniform distribution f(n).

Since the antenna array in the horizontal direction is in uniform distribution, a method of performing channel estimation on the traditional antenna array of uniform distribution in the prior art may be adopted, such that the precoding matrix indicator (PMI) and CQI in the horizontal direction are obtained and fed back to the device at the transmitting end.

Regarding the vertical direction, in the prior art, with respect to the antenna array of uniform distribution in the vertical direction, precoding is performed by adopting a codebook constituted by vectors in the form of a DFT vector (also called channel steering vector). With respect to a given path p, the DFT vector (i.e. the codeword) may be expressed as the form of equation (2):

$$(h^p_{v,k})_{URA} = \left[1, \ldots, \exp\left\{-j2\pi\frac{nD}{\lambda}\sin\beta^p_k\right\},\right. \\ \left.\ldots, \exp\left\{-j2\pi\frac{(N-1)D}{\lambda}\sin\beta^p_k\right\}\right] \quad (2)$$

where $(h^p_{v,k})_{URA}$ is a channel steering vector of a vertical domain of a kth user, $\lambda$ is a wavelength of a signal, D is spaces between of antenna elements in the vertical direction under the traditional uniform distribution (URA), $\beta^p_k$ is an angle of arrival in the vertical direction of a pth path, each quantization value of $\beta^p_k$ corresponds to one codeword. For example, when the quantization step size is 30 degree, $\beta^p_k$ is quantized into $\beta_i$: $\{\beta_0=0, \beta_1=30, \beta_2=60, \beta_3=90\}$. At this time, there will be 4 codewords in the codebook, which may be expressed by a sequence number i=0,1,2,3, respectively. The quantization bit number decides the size of the codebook, and influences the precision of channel estimation and precoding. The collection of all codewords is the codebook. The device at the receiving end may select a codeword which matches the direction vector of the downlink channel estimated by it, and feed back the selected codeword or the sequence number of the codeword, as PMI, to the device at the transmitting end for precoding by the device at the transmitting end. In a case where both the device at the receiving end and the device at the transmitting end have stored the codebook in advance, it is possible to feed back only the sequence number i, as PMI, to the device at the transmitting end.

However, as shown in FIG. 1B, the antenna array according to the present disclosure follows non-uniform distribution in the vertical direction, therefore the channel steering vector in the vertical direction can not be expressed by the codeword in the form of the DFT vector as shown in equation (2), otherwise significant deviation of channel estimation and significant reduction of precoding efficiency wil be caused. Therefore, the present disclosure proposes to use a new codebook to replace the traditionally used codebook in the form of DFT. In the new codebook, each codeword is in the form of a non-DFT vector, may be expressed as equation (3):

$$(h_{v,k}^p)_{Non-URA} = \left[ 1, \ldots, \exp\left\{-j2\pi \frac{f(n)}{\lambda} \sin\beta_k^p\right\}, \ldots, \exp\left\{-j2\pi \frac{f(N)}{\lambda} \sin\beta_k^p\right\} \right] \quad (3)$$

where f(n) is a distribution function of the antenna array, represents a distance between a nth antenna element and a 1st antenna element. The remaining parameters are the same as equation (2). A direction of channel in the vertical direction may be indicated by a channel steering vector in the form of non-DFT such as expressed by equation (3).

As may be seen from equation (3) that, the antenna space D in the codebook in the form of DFT shown in equation (2) is replaced by the distribution function f(n) of the antenna array. Therefore, the device at the receiving end needs to know the distribution function f(n) of the antenna array at the side of the device at the transmitting end to be able to determine the used codebook, thereby selects an appropriate codeword from the codebook for feeding back to the device at the transmitting end.

Therefore, the device at the receiving end may acquire the distribution function f(n) of the antenna array in advance in various ways, for example, the device at the receiving end may receive the distribution function f(n). Or, the device at the receiving end may receive at least a part of parameters of the distribution function f(n), and obtain the distribution function f(n) according to the function form as well as constants of the distribution function f(n) stored locally in advance, in conjunction with received parameters. And preferably, the processing circuitry of the device at the receiving end may be configured to determine a codebook corresponding to the non-uniform distribution based on the information on non-uniform distribution of the antenna array acquired from the device at the transmitting end, i.e. the distribution function f(n). When determining the codebook, it is possible to generate the codebook in real time e.g. in the form of equation (3), according to received non-uniform distribution information, it is also possible to store codebook corresponding to various distribution functions in an internal or external memory of the device at the receiving end in advance, and after knowing the distribution function used at the device at the transmitting end, a corresponding codebook is selected to be used.

After determining the used codebook, the processing circuitry of the device at the receiving end may determine channel state information in the following way: first, determine in the codebook a codeword which matches with the result of channel estimation, then, determine information indicating a direction of channel according to a matched codeword.

Specifically, for example, when determining in the codebook a codeword which matches with the result of channel estimation, it is possible to perform correlation operations on the estimated channel direction vector of the downlink channel and each codeword in the codebook, and select a codeword with a maximum correlation as the matched codeword.

After the matched codeword is selected, since each codeword of the codebook corresponds to a different angle of arrival, and as described before, the angle of arrival is an angle between a signal received by the device at the transmitting end from the device at the receiving end and a normal of an antenna plane, representing the direction of the channel, it is possible to determine the direction of the channel according to the selected matched codeword.

For example, in the example shown before, when the angle of arrival $\beta_k^p$ is quantized into $\beta_i$: $\{\beta_0=0, \beta_1=30, \beta_2=60, \beta_3=90\}$, there will be 4 codewords in the codebook, which may be expressed by a sequence number i=0,1,2,3, respectively. At this time, it is assumed that, after performing correlation operations on the estimated channel direction vector of the downlink channel and 4 codewords in the codebook respectively, the correlation degree between the codeword $(h_{v,k}^p)_{Non-URA}$ corresponding to $\beta_1=30$ and the estimated channel direction vector of the downlink channel is calculated to be maximum. Then, the codeword $(h_{v,k}^p)_{Non-URA}$ corresponding to $\beta_1=30$ is determined to be the matched codeword. At this time, the direction of the channel is determined to be the direction in which the angle of arrival is 30 degree.

In order to notify the direction of the channel to the device at the transmitting end, the processing circuitry of the device at the receiving end may transmit the selected codeword or the determined angle of arrival to the device at the transmitting end. Preferably, the device at the receiving end transmits only the sequence number of the codeword, as PMI, to the device at the transmitting end, to reduce communication traffic. Preferably, as with the prior art, the processing circuitry of the device at the receiving end also feeds back the estimated channel quality, as CQI, to the device at the transmitting end.

In addition, when the distribution mode of the antenna array at the side of the device at the transmitting end changes, preferably, the processing circuitry of the device at the receiving end also is further configured to determine updated channel state information for feeding back to the device at the transmitting end, in response to acquisition of updated information on non-uniform distribution from the device at the transmitting end. In an optimum algorithm, the distribution mode of the antenna array at the side of the device at the transmitting end is dynamically changed. For example, the device at the transmitting end may check changes in the communication environment through channel state information fed back from the device at the receiving end, evaluate performance gains which can be caused by various distribution modes of the antenna array, thereby select an optimum distribution mode to change the distribution of the antenna array accordingly. A process of adjusting the antenna distribution mode by the device at the transmitting end will be described in a subsequent part of the present disclosure.

In summary, when the distribution function f(n) of the antenna array at the side of the device at the transmitting end changes due to change in the communication environment, after the device at the receiving end acquires the updated distribution function f(n), according to the updated distribution function f(n), in the above mentioned way, the device at the receiving end re-performs channel estimation, determines new PMI and CQI, and thereby feeds back the updated channel state information to the device at the transmitting end.

Figure 6A:
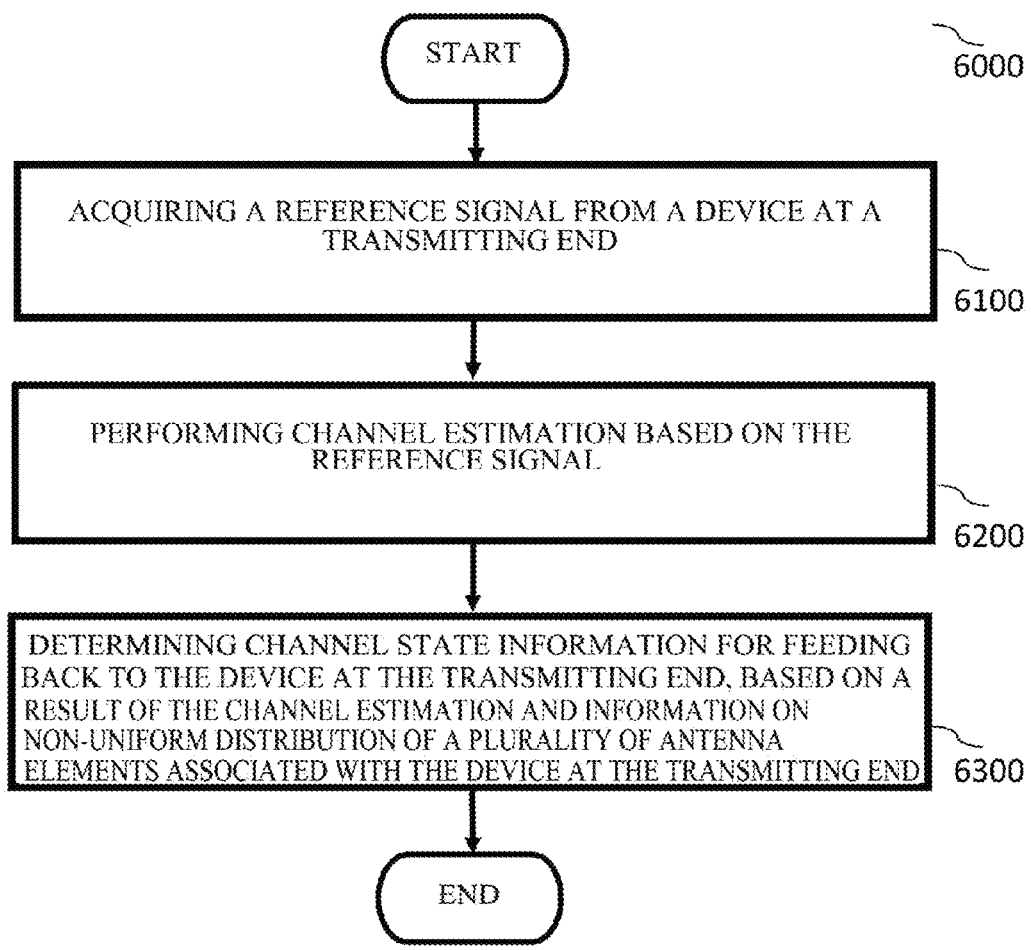
FIG. 6A is a flow chart illustrating a process of a device at a receiving end according to one embodiment.

A device at a receiving end according to an embodiment of the present disclosure is described above. Accordingly, the present disclosure provides a wireless communication method which may be used for the above mentioned device at the receiving end. FIG. 6A is a flow chart illustrating a process 6000 of a device at a receiving end according to one embodiment.

As shown in FIG. 6A, in step 6100, the device at the receiving end acquire a reference signal from a device at a transmitting end. Spaces in a vertical direction, between adjacent antenna elements of at least a part of the plurality of antenna elements associated with the device at the transmitting end increase gradually in a direction approaching the device at the receiving end or ground, or in a direction getting away from the device at the receiving end or ground. In step 6200, the device at the receiving end performs channel estimation based on the reference signal. In step 6300, the device at the receiving end determines channel state information for feeding back to the device at the transmitting end, based on a result of the channel estimation and information on non-uniform distribution of a plurality of antenna elements associated with the device at the transmitting end. Specific implementations of steps 6100-6300 have been already described above in an exemplary way, and are no longer repeated herein.

Figure 6B:
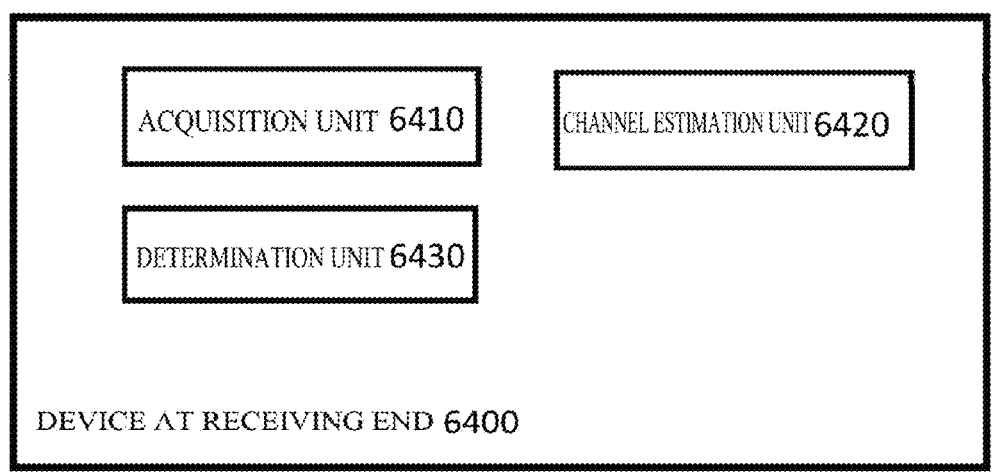
FIG. 6B is a block diagram illustrating a configuration of a device at a receiving end according to one embodiment.

FIG. 6B is a block diagram illustrating a configuration of a device 6400 at a receiving end according to one embodiment.

As shown in FIG. 6B, the device 6400 at the receiving end may include an acquisition unit 6410 for executing step 6100, a channel estimation unit 6420 for executing step 6200, and a determination unit 6430 for executing step 6300.

A device at a receiving end and a communication method thereof according to an embodiment of the present disclosure are described above. Hereinafter, a device at a transmitting end which can communicate with the above mentioned the device at the receiving end and adopt an antenna array of non-uniform distribution, and a communication method thereof, according to the present disclosure will be described.

<4. Process of Device at Transmitting End>

According to one embodiment of the present disclosure, a device at a transmitting end may include a processing circuitry configured to: generate non-uniform distribution information indicating non-uniform distribution state of a plurality of antenna elements associated with the device; acquire channel state information from a device at a receiving end; and determine a channel state based on the channel state information and the non-uniform distribution information. wherein spaces, in a vertical direction, between adjacent antenna elements of at least a part of the plurality of antenna elements associated with the device at the transmitting end increase gradually in a direction approaching the device at the receiving end or ground, or in a direction getting away from the device at the receiving end or ground.

The device at the transmitting end according to the above mentioned embodiment may include the antenna array itself, may also not include the antenna array, but is communicatively connected with the antenna array. The generated non-uniform distribution information may be in various forms. For example, the non-uniform distribution information may be a function f(n) expressing a non-uniform distribution state of a plurality of antenna elements or parameters in f(n). For example, in a case where f(n) is an exponential function, the non-uniform distribution information may be the exponential factor α of the exponential function. Further, for example, in a case where the device at the transmitting end and the device at the receiving end have already stored predetermined several functions f(n), the non-uniform distribution information may also only is an index representing f(n).

After deployment of the antenna array is completed, or every time the distribution mode of the antenna array changes, corresponding non-uniform distribution information may be generated actively, the non-uniform distribution information may also be generated in response to a request from the device at the receiving end.

Preferably, the processing circuitry of the device at the transmitting end may be further configured to perform control to transmit the non-uniform distribution information generated as described above to the device at the receiving end. Transmission of the non-uniform distribution information may be performed actively by the device at the transmitting end, may also be performed in response to a request from the device at the receiving end. It is possible to transmit the non-uniform distribution information in an initialization stage in which the device at the transmitting end and the device at the receiving end establish communication, and no longer transmit it repeatedly in the course of communication. In addition, it is also possible to, periodically or after the non-uniform distribution information changes, transmit the updated non-uniform distribution information to the device at the receiving end, so that the device at the receiving end re-performs processes such as channel estimation, precoding codebook selection. It is noted that, in an FDD system, since the device at the receiving end performs channel estimation, and needs to determine channel state information including codebook selection according to the result of the channel estimation and non-uniform distribution information received from the device at the transmitting end, and feeds back to the device at the transmitting end feedback, the device at the receiving end needs to know the distribution mode of the antenna array at the side of the device at the transmitting end. However, in a time division duplex (TDD) system, since the device at the receiving end only needs to transmit CSI-RS of the uplink channel as well as the channel quality indicator CQI to the device at the transmitting end, but does not need to estimate the direction of the channel itself and feed back selection of codewords, the device at the transmitting end may not notify the distribution case of the antenna array of the device at the receiving end.

Then, the processing circuitry of the device at the transmitting end is configured to acquire channel state information from the device at the receiving end. In the TDD system, the channel state information transmitted by the device at the receiving end may include CQI. In the FDD communication system, in addition to CQI, the channel state information may also include information indicating an angle of arrival. As described before, the angle of arrival is the angle between the signal received from the device at the receiving end and the normal of the antenna plane.

Preferably, as described above in describing the device at the receiving end, because the codebook is determined based on non-uniform distribution information, and each codeword in the codebook corresponds to a different angle of arrival, the information indicating the angle of arrival may be information of selection of the codeword in the codebook by the receiving end (such as, a precoding matrix indicator (PMI)). After acquiring channel state information from the device at the receiving end, the processing circuitry of the device at the transmitting end is configured to determine a channel state based on the channel state information and the non-uniform distribution information of the antenna array.

For example, in the FDD system, since the channel state information acquired from the device at the receiving end contains information indicating the angle of arrival, e.g. PMI, the processing circuitry of the device at the transmitting end at this time may determine the direction of the channel based on the information indicating the angle of arrival (e.g. PMI) and non-uniform distribution information of the antenna array, e.g. determine the channel steering vector.

For example, as described above with reference to the process of the device at the receiving end, the channel steering vector according to one embodiment of the present disclosure adopts the vector $(h_{v,k}^P)_{Non-URA}$ in form of non-DFT as shown in equation (3). In this case, after obtaining PMI from the device at the receiving end, the processing circuitry of the device at the transmitting end may calculate a corresponding channel steering vector $(h_{v,k}^P)_{Non-URA}$ in conjunction with the non-uniform distribution function f(n) of the antenna array generated before. For example, still taking the angle of arrival $\beta_k^P$ being quantized into $\beta_i$: {$\beta_0=0$, $\beta_1=30$, $\beta_2=60$, $\beta_3=90$} as an example, the processing circuitry of the device at the transmitting end may obtain the sequence number i (i=0,1,2,3) from the device at the receiving end, thereby determine the specific quantization value $\beta_i$ of the angle of arrival. Then, the channel steering vector $(h_{v,\ k}^P)_{Non-URA}$ is calculated according to equation (3).

In a preferable embodiment, the processing circuitry of the device at the transmitting end can also adjust the distribution mode of the antenna array dynamically.

For example, the processing circuitry of the device at the transmitting end may be further configured to: acquire updated information on the angle of arrival from the device at the receiving end; calculate updated non-uniform distribution information based on the updated information on the angle of arrival; and transmit the updated non-uniform distribution information to an antenna adjustment circuitry for adjusting the non-uniform distribution state of the plurality of antenna elements in the antenna array. For example, the processing circuitry of the device at the transmitting end may use an optimum algorithm (Optimal Scheme, OS) to dynamically adjust the exponential factor based on a short time user maximum average spectral efficiency criterion, thereby dynamically adjust the non-uniform antenna distribution of the vertical domain. Or, the processing circuitry of the device at the transmitting end may use a quasi-optimal algorithm (Sub-optimal Scheme, OS) to select a fixed exponential factor based on a long time user maximum average spectral efficiency criterion, thereby quasi-statically determine the non-uniform antenna distribution of the vertical domain.

In the quasi-optimal algorithm, the frequency of adjusting spaces between antenna elements is low, therefore it is possible to save signaling resources and avoid CPU resources occupied by computation of the codebook. In the optimum algorithm, the frequency of adjusting spaces between antenna elements is high, therefore it is possible to adapt to dynamic changes in the channel more timely, increase discrimination of users in the vertical direction.

Preferably, the specific process of calculating updated non-uniform distribution information based on the updated information on the angle of arrival is as follows. First, a number of non-uniform distribution of the plurality of antenna elements are generated. Then, based on the updated information indicating the angle of arrival received from the device at the receiving end, values of an optimization objective under different non-uniform distributions are calculated. Thereafter, an optimal non-uniform distribution is selected, non-uniform distribution information corresponding to the optimal non-uniform distribution is acquired as updated non-uniform distribution information. Hereinafter, the specific description is made.

First, a number of non-uniform distributions of the antenna array are generated to be used as candidates of the optimum distribution. For example, the number of non-uniform distributions may be distributions in accordance with different kinds of distribution functions (e.g. an exponential function, a tangent function, etc), may also be a distribution in accordance with the same kind of distribution function having different parameters (e.g. an exponential function having different exponential factors α).

Then, based on the updated information indicating the angle of arrival received from the device at the receiving end, values of an optimization objective under different non-uniform distributions are calculated. For example, first, channel matrixes under different non-uniform distributions may be generated according to the information of the angle of arrival. Here, it may be achieved by, under different distribution functions f(n), in accordance with $(h_{v,\ k}^P)_{Non-URA}$ as shown in e.g. equation (3), generating approximate channel steering vectors in the vertical direction of downlink channels having the same channel quality, and then, calculating the Kronecker product of the generated respective channel steering vectors in the vertical direction corresponding to different distribution functions f(n) and channel steering vectors in the horizontal direction to obtain respective channel matrixes corresponding to different distribution functions f(n). Methods of calculating the channel steering vector in the horizontal direction as well as calculating the Kronecker product are both known in the prior art. Then, the obtained respective channel matrixes are used to perform precoding respectively so as to calculate values of the optimization objectives in distribution modes of the antenna array generated by using different distribution functions f(n). For example, the optimization objective may be average spectral efficiency, throughput, signal to noise ratio, worst spectral efficiency and best spectral efficiency, etc. Taking the average spectral efficiency as an example, it is possible to calculate interferences between users in a cell in different antenna array distribution modes thereby obtain the average spectral efficiency. All these optimization objectives are better when they have larger values. However, those skilled in the art may recognize that, there are other optimization objectives, and it is not necessarily good for all the optimization objectives to maximize their values.

After calculating values of the optimization objectives in distribution modes of the antenna array generated by using different distribution functions f(n), non-uniform distribution which causes the value of optimization objective to be optimal may be easily selected as the optimal non-uniform distribution, and non-uniform distribution information corresponding to the optimal non-uniform distribution, e.g. the distribution function f(n) or parameters thereof, is transmitted to the antenna adjustment circuitry as the updated non-uniform distribution information, in order to adjust the distribution state of the antenna array at the side of the device at the transmitting end.

Unlike the above described process in the FDD system, in the TDD system, since the uplink channel and the downlink channel occupy the same spectral resources, according to symmetry of channels, it is not necessary for the device at the receiving end to estimate and feed back the channel steering vector of the downlink channel or selection of the codeword. Rather, the device at the transmitting end may estimate the downlink channel state based on the uplink reference channel For example, in the TDD system, the process of the processing circuitry of the device at the transmitting end determining the channel state based on channel state information and non-uniform distribution information may include: estimating the channel steering vector representing the direction of the channel based on the channel state information.

Specifically, in the TDD system, the device at the receiving end may transmit an uplink reference signal, e.g. SoundingReferenceSignal, to the device at the transmitting end, the device at the transmitting end may determine downlink channel state information itself according to symmetry of TDD uplink and downlink channels, and the receiving end does not need to feed back the channel state, the processing circuitry of the device at the transmitting end needs to perform channel estimation itself. Similar to the previously described process of the processing circuitry of the device at the receiving end performing channel estimation, the processing circuitry of the device at the transmitting end estimates the channel steering vector representing the direction of the channel according to the uplink reference signal, thereby generates the precoding matrix and performs the subsequent precoding process.

According to one embodiment, whether in the FDD system or in the TDD system, the processing circuitry of the device at the transmitting end may be further configured to perform precoding based on the determined channel state. For example, the processing circuitry of the device at the transmitting end may use the Kronecker product of the channel steering vector based on non-DFT in the vertical direction and the channel steering vector based on DFT in the horizontal direction as well as a polarization phase coefficient of the antenna array to generate a total precoding matrix. The precoding operation adops a match filter precoding or zero forcing precoding algorithm. Specific methods of precoding are known in the prior art, which are not specifically described here. In comparison with beam-forming, an advantage of precoding is that it can reduce interfere between users more effectively, improve the average spectral efficiency.

Figure 7A:
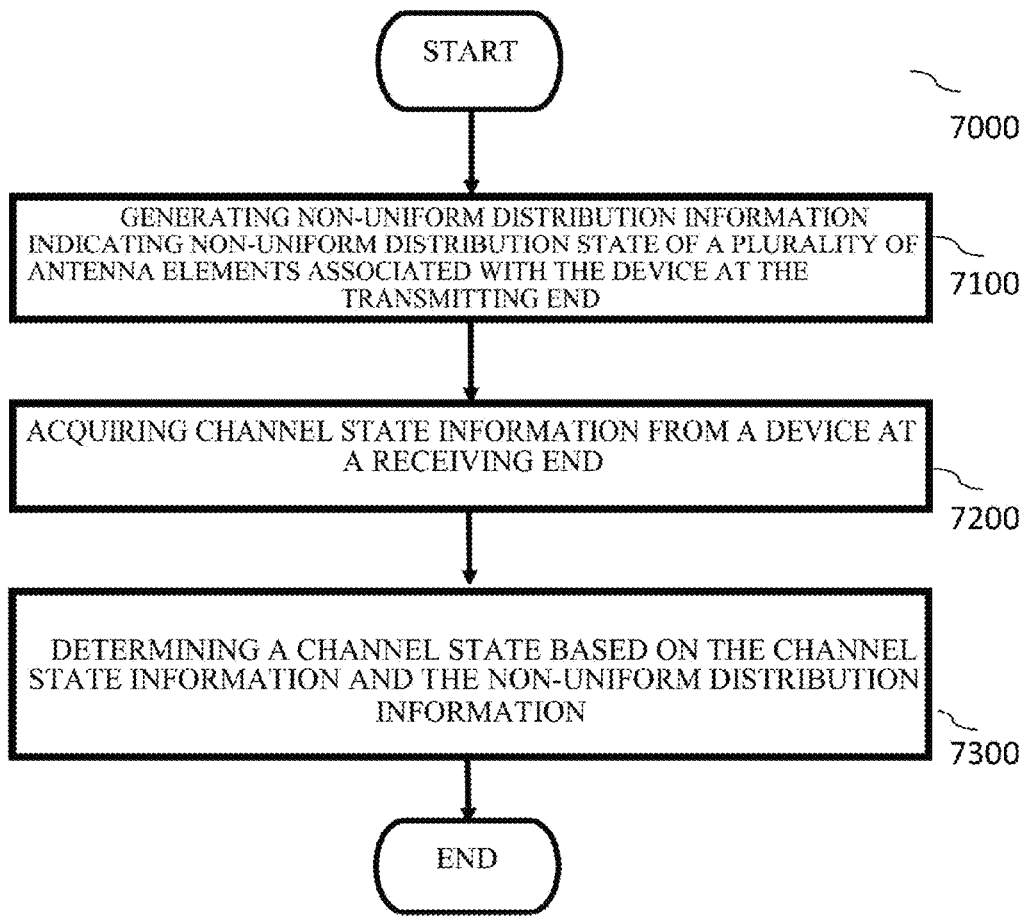
FIG. 7A is a flow chart illustrating a process of a device at a transmitting end according to one embodiment.

A device at a transmitting end according to an embodiment of the present disclosure is described above. Accordingly, the present disclosure provides a wireless communication method which may be used for the above mentioned device at the transmitting end. FIG. 7A is a flow chart illustrating a process 7000 of a device at a transmitting end according to one embodiment.

As shown in FIG. 7A, in step 7100, the device at the transmitting end generates non-uniform distribution information indicating non-uniform distribution state of a plurality of antenna elements associated with the device. Spaces in a vertical direction, between adjacent antenna elements of at least a part of the plurality of antenna elements associated with the device at the transmitting end increase gradually in a direction approaching the device at the receiving end or ground, or in a direction getting away from the device at the receiving end or ground. In step 7200, the device at the transmitting end acquires channel state information from the device at the receiving end. In step 7300, the device at the transmitting end determines a channel state based on the channel state information and the non-uniform distribution information.

Figure 7B:
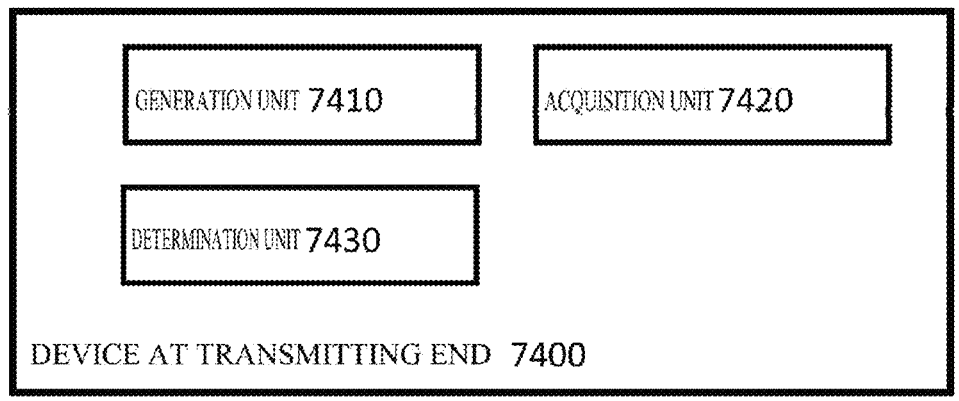
FIG. 7B is a block diagram illustrating a configuration of a device at a transmitting end according to one embodiment.

FIG. 7B is a block diagram illustrating a configuration of a device 7400 at a transmitting end according to one embodiment.

As shown in FIG. 7B, the device 7400 at the transmitting end may include a generation unit 7410 for executing step 7100, an acquisition unit 7420 for executing step 7200, and a determination unit 7430 for executing step 7300.

<5. Simulation Result>

A one-cell-multiple-user simulation environment as shown in FIG. 4 is considered. It is assumed that, the radius R of the cell is equal to 250 m, the number K of users who share time-frequency resources is 8. Each base station of the cell is located at the center, its height is 35 m, while users' positions are randomly distributed uniformly. It is assumed that, an angle extension in a horizontal direction is 180 degree, an angle extension in a vertical direction is 5 degree, the antenna array size is 8×8.

In the simulation, the following 3D narrowband multipath channel model is adopted, and a structure which approximates the Kronecker product is used:

$$H_k = \sum_{p=1}^{P} H_k^p \approx \left( \sum_{p=1}^{P} \rho_k^p (h_{h,k}^p)^T \right) \otimes h_{v,k}$$

where $H_k^p \in C^{N_y \times N_x}$ is a channel matrix of a pth path of a kth user, P=20 is the number of the multiple paths, $(h_{h,k}^p)^T$ and $h_{v,k}$ are respectively a steering vector in the horizontal direction and an approximate steering vector in the vertical direction. Since, in a real environment, the angle extension in the vertical direction is relatively small, the approximation is generally reasonable. $\rho_k^p$ is a large scale fading coefficient, which is calculated by the following equation:

$$\rho_k^p = z_k^p/(d_k)^\beta$$

where $d_k$ is a distance from the base station to a kth user, $\beta$ is a path loss coefficient, $z_k$ is a shadow fading coefficient, and follows logarithmic normal distribution with a variance of $\sigma_z^2$. In the simulation, it is assumed that $\beta=3.5$, $\sigma_z=8$ dB.

Figure 8:
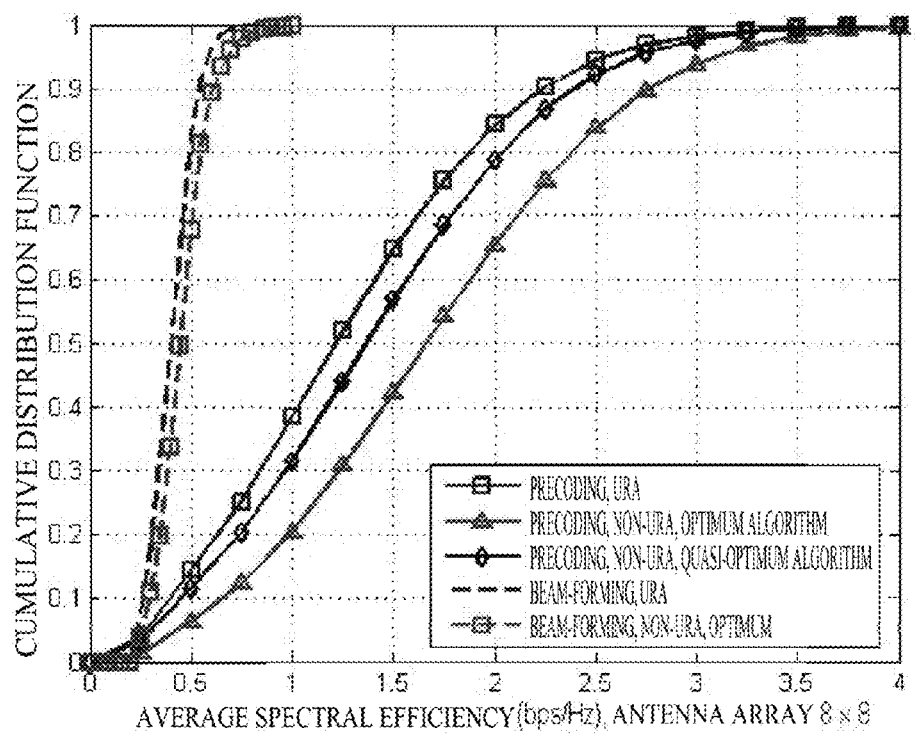
FIG. 8 is a simulation diagram illustrating cumulative distribution functions of average spectral efficiency in different schemes.

FIG. 8 is a simulation diagram of cumulative distribution functions of average spectral efficiency in different schemes. As may be seen from the figure that, the performance of the beam-forming scheme is much worse than that of the precoding scheme, this is because, in a case where there are a limited number of antennas in the vertical direction, the beam-forming fails to utilize the degree of freedom in the vertical direction effectively.

In the precoding scheme, in comparison with a traditional uniform antenna array (URA), adopting a non-uniform antenna array (non-URA) can obtain better spectral efficiency performance. In the case of adopting a combination of precoding and a non-uniform antenna array, the performance of the optimum algorithm is better than that of the quasi-optimal algorithm. For example, in the case of adopting a combination of precoding and a uniform antenna array, a probability that the average spectral efficiency is less than or equal to 2 bps/Hz is about 0.84, in the case of adopting a combination of precoding, a non-uniform antenna array and a quasi-optimal algorithm, a probability that the average spectral efficiency is less than or equal to 2 bps/Hz is about 0.79, in the case of adopting a combination of precoding, a non-uniform antenna array and an optimal algorithm, a probability that the average spectral efficiency is less than or equal to 2 bps/Hz is about 0.66. As may be seen that, in the case of adopting the combination of precoding, the non-uniform antenna array and the optimal algorithm, the probability of obtaining high average spectral efficiency is higher.

Figure 10:
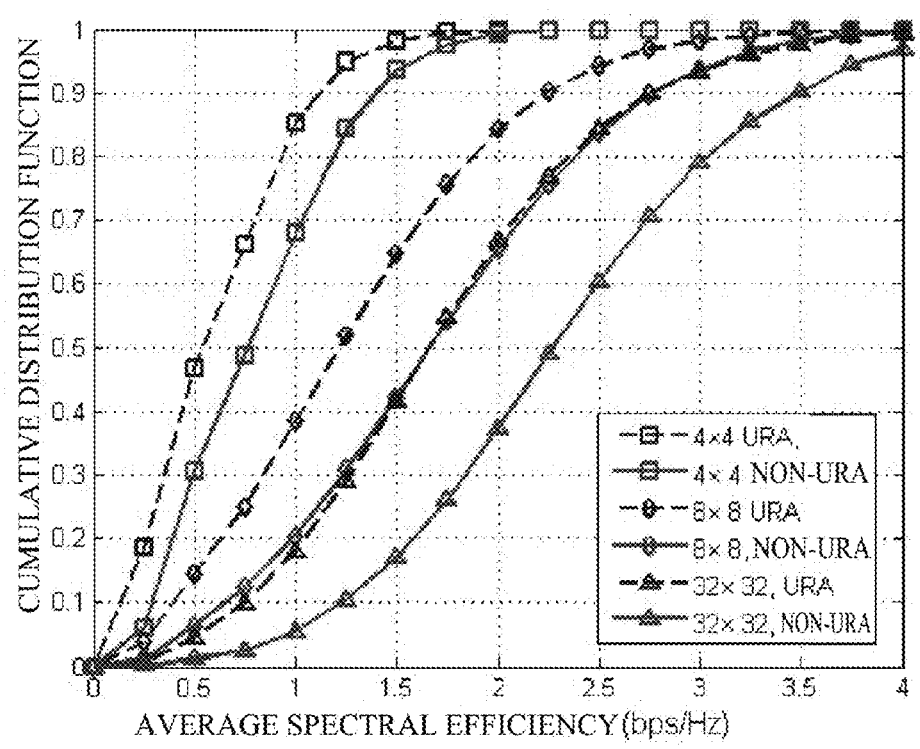
FIG. 10 is a simulation diagram illustrating cumulative distribution functions of average spectral efficiency of uniform antenna arrays and non-uniform antenna arrays with respect to antenna arrays of different sizes.

FIG. 10 is a simulation diagram illustrating cumulative distribution functions of average spectral efficiency of uniform antenna arrays (URA) and non-uniform antenna arrays (non-URA) with respect to antenna arrays of different sizes. It may be seen that, with respect to antenna arrays of different sizes, the performance of the non-uniform antenna array is always better than that of the uniform antenna array. Moreover, the larger the antenna array is, the larger performance gain is. For example, in the case of a 4×4, 8×8 or 32×32 antenna array, a probability that the average spectral efficiency in the non-uniform antenna array scheme is less than or equal to a certain value is always lower than a probability that the average spectral efficiency in the uniform antenna array scheme is less than or equal to the certain value. On the other hand, in the case of adopting a non-uniform antenna array, a probability that the average spectral efficiency in the 32×32 antenna array scheme is less than or equal to a certain value is lower than a probability that the average spectral efficiency in the 4×4 and 8×8 antenna array schemes is less than or equal to the certain value. That is, in the case of adopting the non-uniform antenna array or the larger antenna array, the probability of obtaining high average spectral efficiency is higher.

The above mentioned results show that, in comparison with the traditional uniform antenna array, adopting the non-uniform antenna array in the vertical direction can better reduce interference between users, improve the overall spectral efficiency, use advantages of 3D MIMO. Based on the channel state and the antenna array distribution mode, adopting the optimum algorithm to select the codebook in the form of non-DFT in the vertical direction can optimize discrimination of users by the base station antennas, that is also the form of the codebook more suitable for 3D MIMO case, thereby further improving the performance.

<6. Application Examples>

The technology of the present disclosure can be applied to various products.

For example, a device at a transmitting end may be realized as any type of evolved Node B (eNB) such as a macro eNB, and a small eNB. A small eNB may be an eNB that covers a cell smaller than a macro cell, such as a pico eNB, micro eNB, or home (femto) eNB. Instead, the device at the transmitting end may be realized as any other types of base stations such as a NodeB and a base transceiver station (BTS). The device at the transmitting end may include a main body (that is also referred to as a base station device) configured to control wireless communication, and one or more remote radio heads (RRH) disposed in a different place from the main body. Additionally, various types of terminals to be discussed later may also operate as the device at the transmitting end by temporarily or semi-permanently executing a base station function.

For example, the device at the receiving end may be realized as a mobile terminal such as a smartphone, a tablet personal computer (PC), a notebook PC, a portable game terminal, a portable/dongle type mobile router, and a digital camera, or an in-vehicle terminal such as a car navigation device. The device at the receiving end may also be realized as a terminal (that is also referred to as a machine type communication (MTC) terminal) that performs machine-to-machine (M2M) communication. Furthermore, the device at the receiving end may be a wireless communication module (such as an integrated circuit module including a single die) mounted on each of the terminals.

[6-1. Application Examples Regarding Base Stations]

(First Application Example)

FIG. 11 is a block diagram illustrating a first example of a schematic configuration of an eNB to which the technology of the present disclosure may be applied. An eNB 800 includes one or more antennas 810, a base station device 820, and an antenna adjustment circuitry 870. The base station device 820 and each antenna 810 may be connected to each other via an RF cable.

Each of the antennas 810 includes a single or multiple antenna elements (such as multiple antenna elements included in an multiple input multiple output (MIMO) antenna), and is used for the base station device 820 to transmit and receive wireless signals. The eNB 800 may include the multiple antennas 810, as illustrated in FIG. 11. For example, the multiple antennas 810 may be compatible with multiple frequency bands used by the eNB 800. Although FIG. 11 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The antenna adjustment circuitry 870 is communicatively connected to the controller 821 and the antennas 810. The controller 821 may control the antenna adjustment circuitry 870 to adjust spaces between multiple antenna elements in the antennas 810.

The network interface 823 is a communication interface for connecting the base station device 820 to a core network 824. The controller 821 may communicate with a core network node or another eNB via the network interface 823. In that case, the eNB 800, and the core network node or the other eNB may be connected to each other through a logical interface (such as an S1 interface and an X2 interface). The network interface 823 may also be a wired communication interface or a wireless communication interface for radio backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives wireless signals via the antenna 810.

The wireless communication interface 825 may include the multiple BB processors 826, as illustrated in FIG. 11. For example, the multiple BB processors 826 may be compatible with multiple frequency bands used by the eNB 800. The wireless communication interface 825 may include the multiple RF circuits 827, as illustrated in FIG. 11. For example, the multiple RF circuits 827 may be compatible with multiple antenna elements. Although FIG. 11 illustrates the example in which the wireless communication interface 825 includes the multiple BB processors 826 and the multiple RF circuits 827, the wireless communication interface 825 may also include a single BB processor 826 or a single RF circuit 827.

(Second Application Example)

Figure 12:
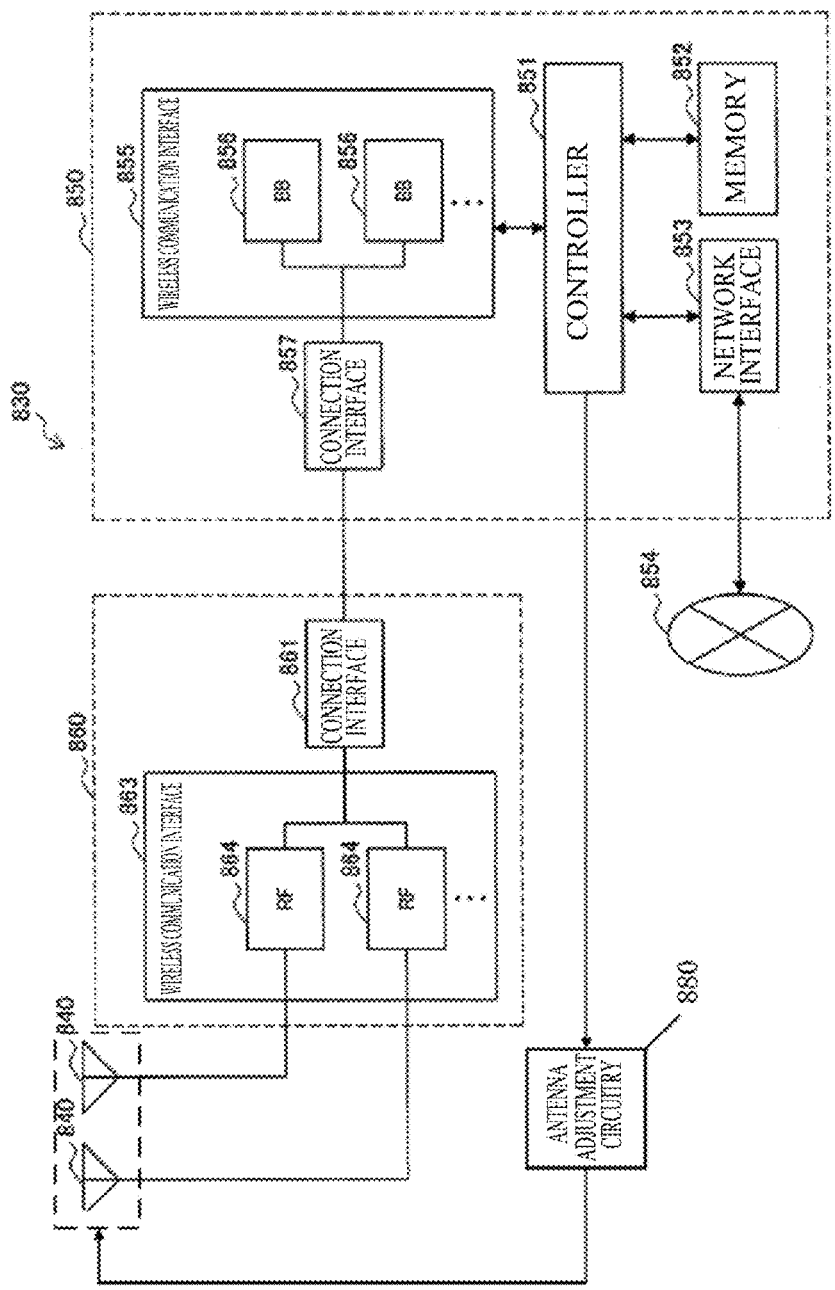
FIG. 12 is a block diagram illustrating a second example of a schematic configuration of an eNB.

FIG. 12 is a block diagram illustrating a second example of a schematic configuration of an eNB to which the technology of the present disclosure may be applied. An eNB 830 includes one or more antennas 840, a base station device 850, an RRH 860, and an antenna adjustment circuitry 880. The RRH 860 and each antenna 840 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna) and is used for the RRH 860 to transmit and receive wireless signals. The eNB 830 may include the multiple antennas 840, as illustrated in FIG. 12. For example, the multiple antennas 840 may be compatible with multiple frequency bands used by the eNB 830. Although FIG. 12 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 11.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 11, except the BB processor 856 is connected to the RF circuit 864 of the RRH 860 via the connection interface 857. The wireless communication interface 855 may include the multiple BB processors 856, as illustrated in FIG. 12. For example, the multiple BB processors 856 may be compatible with multiple frequency bands used by the eNB 830. Although FIG. 12 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives wireless signals via the antenna 840. The wireless communication interface 863 may typically include, for example, the RF circuit 864. The RF circuit 864 may include, for example, a mixer, a filter, and an amplifier, and transmits and receives wireless signals via the antenna 840. The wireless communication interface 863 may include multiple RF circuits 864, as illustrated in FIG. 12. For example, the multiple RF circuits 864 may support multiple antenna elements. Although FIG. 12 illustrates the example in which the wireless communication interface 863 includes the multiple RF circuits 864, the wireless communication interface 863 may also include a single RF circuit 864.

The antenna adjustment circuitry 880 is communicatively connected to the controller 851 and the antennas 840. The controller 851 may control the antenna adjustment circuitry 880 to adjust spaces between multiple antenna elements in the antennas 840.

[6-2. Application Examples Regarding Terminal Devices]

(First Application Example)

Figure 13:
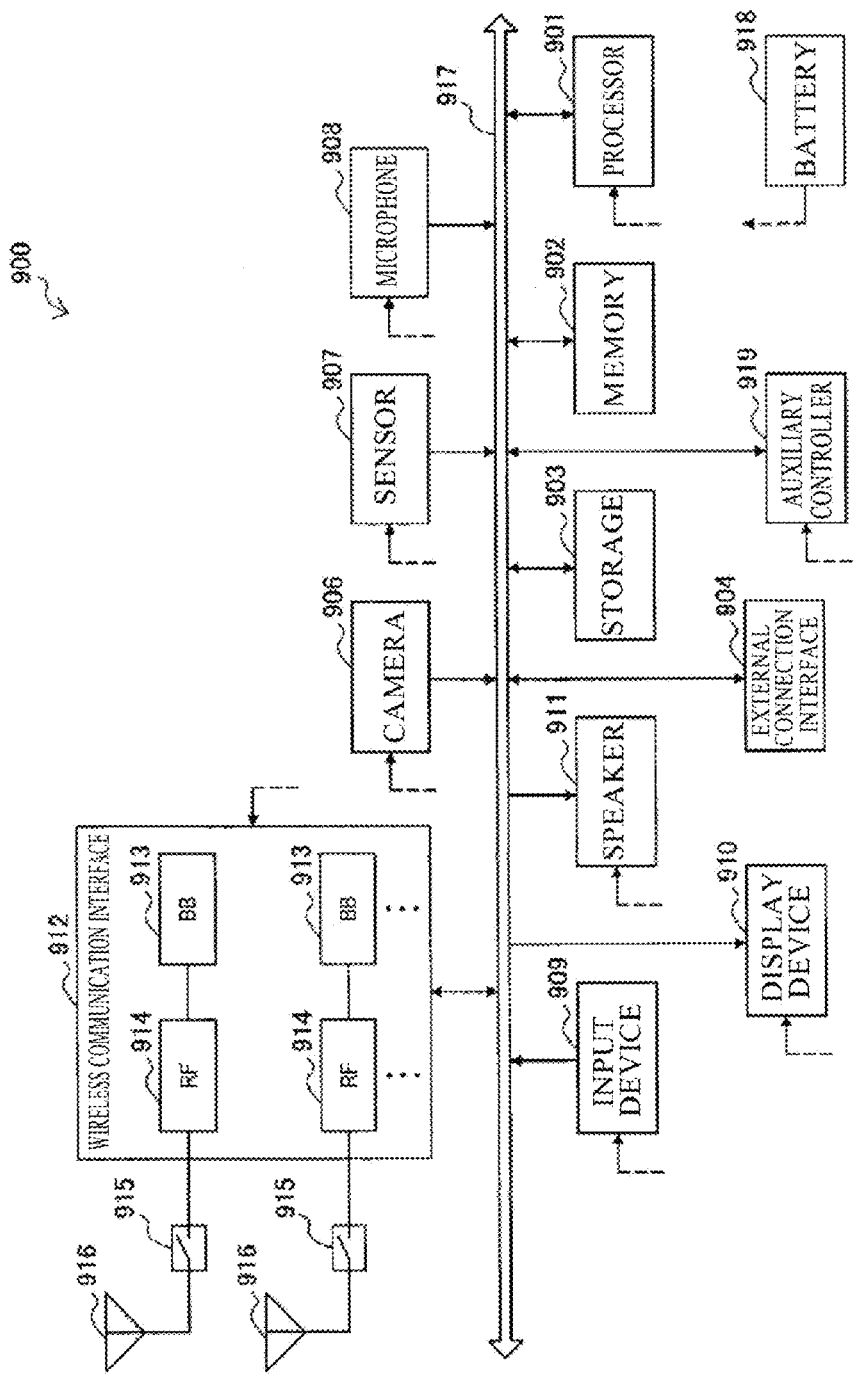
FIG. 13 is a block diagram illustrating an example of a schematic configuration of a smartphone.

FIG. 13 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores data and a program that is executed by the processor 901. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives wireless signals via the antenna 916. The wireless communication interface 912 may be a one chip module that has the BB processor 913 and the RF circuit 914 integrated thereon. The wireless communication interface 912 may include the multiple BB processors 913 and the multiple RF circuits 914, as illustrated in FIG. 13. Although FIG. 13 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive wireless signals. The smartphone 900 may include the multiple antennas 916, as illustrated in FIG. 13. Although FIG. 13 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 13 via feeder lines, which are partially shown as dashed lines in the figure. The auxiliary controller 919 operates a minimum necessary function of the smartphone 900, for example, in a sleep mode.

(Second Application Example)

Figure 14:
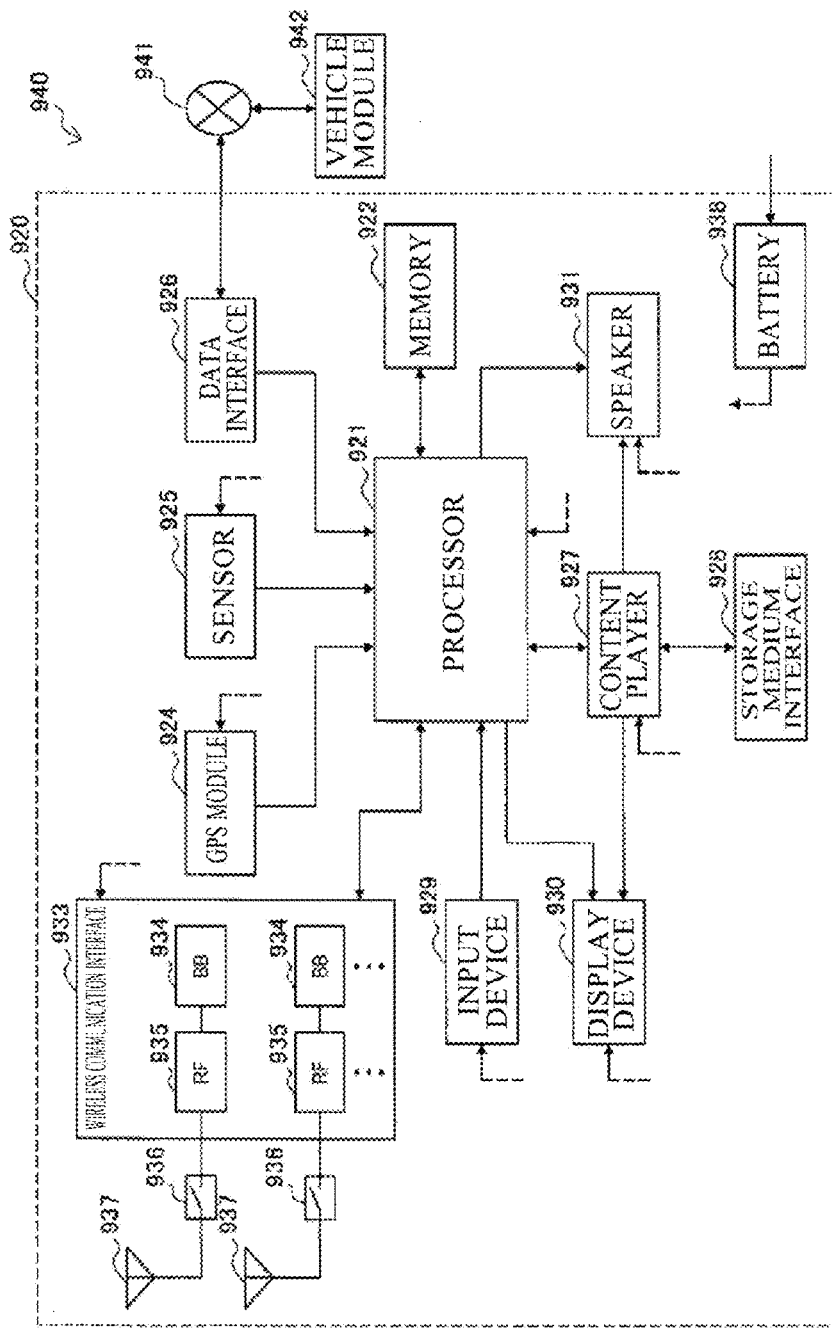
FIG. 14 is a block diagram illustrating an example of a schematic configuration of a car navigation apparatus.

FIG. 14 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores data and a program that is executed by the processor 921.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives wireless signals via the antenna 937. The wireless communication interface 933 may also be a one chip module having the BB processor 934 and the RF circuit 935 integrated thereon. The wireless communication interface 933 may include the multiple BB processors 934 and the multiple RF circuits 935, as illustrated in FIG. 14. Although FIG. 14 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive wireless signals. The car navigation device 920 may include the multiple antennas 937, as illustrated in FIG. 14. Although FIG. 14 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 14 via feeder lines that are partially shown as dashed lines in the figure. The battery 938 accumulates power supplied from the vehicle.

The technology of the present disclosure may also be realized as an in-vehicle system (or a vehicle) 940 including one or more blocks of the car navigation device 920, the in-vehicle network 941, and a vehicle module 942. The vehicle module 942 generates vehicle data such as vehicle speed, engine speed, and trouble information, and outputs the generated data to the in-vehicle network 941.

<7. Conclusion>

A device at a transmitting end and a device at a receiving end and communication processes executed by them according to an embodiment of the present disclosure have been described with reference to the accompanying drawings.

Although preferred embodiments of the present disclosure are described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

In the foregoing embodiments, the example in which the communication system is a system conforming to LTE or LTE-A has been described, but an embodiment of the present disclosure is not limited thereto. For example, the communication system may be a system conforming to another communication standard.

Also, the processing steps in a communication process in this specification are not strictly limited to being executed in a time series following the sequence described in a flowchart. For example, the processing steps in a communication process may be executed in a sequence that differs from a sequence described herein as a flowchart, and furthermore may be executed in parallel.

What is claimed is:

1. A device at a transmitting end, characterized in that the device comprises:
    circuitry configured to
    arrange a plurality of antenna elements in a vertical direction in a 3D massive multiple-input multiple-output (MIMO) system; and
    adjust spaces between adjacent antenna elements of a first set of antenna elements in the plurality of antenna elements so that the spaces increase gradually in the vertical direction by adopting a first non-uniform distribution, and spaces between adjacent antenna elements of a second set of antenna elements in the plurality of antenna elements so that the spaces increase gradually in the vertical direction by adopting a second non-uniform distribution which is different from the first non-uniform distribution, approaching a device at a receiving end or a ground, or getting away from the device at the receiving end or the ground, based on a non-linear function, the spaces being dynamically changed based on working parameters including at least one of a number of the antenna elements, coverage of the device, a number of users served by the device, channel state, and a parameter related to user distribution.

2. The device of claim 1, wherein the non-linear function is a power function $f(n)=D(n-1)^{\alpha}/(N-1)^{\alpha-1}$, where n is a sequence number of an antenna element, f(n) is a distance between the $n^{th}$ antenna element and the $1^{st}$ antenna element of the at least a part of the plurality of antenna elements, D is a constant, N is a total number of the at least a part of the plurality of antenna elements, and α is an exponential factor and larger than 0.

3. The device of claim 2, wherein the exponential factor is smaller than 2.4.

4. The device of claim 1, wherein the spaces are determined based on a number of the antenna elements.

5. The device of claim 1, wherein the spaces are determined based on an angle of arrival, which is an angle between a signal received from the device at the receiving end and a normal of an antenna plane.

6. The device of claim 1, wherein the circuitry is configured to generate, based on the spaces, a precoding matrix for precoding of data to be transmitted.

7. The device of claim 1 further comprises a plurality of antenna elements arranged uniformly in a horizontal direction.

8. The device of claim 1, wherein the non-linear function is at least one of exponential function and tangent function.

9. A device at a transmitting end, characterized in that the device comprises:
    a processing circuitry configured to:
        generate non-uniform distribution information indicating non-uniform distribution state of a plurality of antenna elements arranged in a vertical direction in a 3D massive multiple-input multiple-output (MIMO) system by the device;
        acquire channel state information from a device at a receiving end; and
        determine a channel state based on the channel state information and the non-uniform distribution information,
    wherein spaces are adjusted between adjacent antenna elements of a first set of antenna elements in the plurality of antenna elements so that the spaces increase gradually in the vertical direction by adopting a first non-uniform distribution, and spaces are adjusted between adjacent antenna elements of a second set of antenna elements in the plurality of antenna elements so that the spaces increase gradually in the vertical direction by adopting a second non-uniform distribution which is different from the first non-uniform distribution, approaching the device at the receiving end or ground, or getting away from the device at the receiving end or ground, based on a non-linear function, the spaces being dynamically changed based on working parameters including at least one of a number of the antenna elements, coverage of the device, a number of users served by the device, channel state, and a parameter related to user distribution.

* * * * *